United States Patent
Barreto De Miranda Sargento et al.

(10) Patent No.: US 9,439,121 B2
(45) Date of Patent: Sep. 6, 2016

(54) METHOD AND APPARATUS FOR MULTI-NETWORK COMMUNICATION IN VEHICULAR NETWORKS

(71) Applicants: UNIVERSIDADE DE AVEIRO, Aveiro (PT); INSTITUTO DE TELECOMUNICAÇÕES, Aveiro (PT); VENIAM, UNIPESSOAL LDA, Porto (PT)

(72) Inventors: Susana Isabel Barreto De Miranda Sargento, Ilhavo (PT); André Amorim De Faria Cardote, Aveiro (PT); João Francisco Cordeiro De Oliveira Barros, Porto (PT); Ricardo Jorge Magalhães De Matos, Vila Real (PT); Filipe Manuel Almeida Neves, Aguada de Baixo (PT); Jorge Filipe Dias, Sever do Vouga (PT); Carlos Eduardo Braga Ameixieira, Aveiro (PT)

(73) Assignees: UNIVERSIDADE DE AVEIRO, Aveiro (PT); INSTITUTO DE TELECOMUNICAÇÕES, Aveiro (PT); VENIAM, UNIPESSOAL LDA, Oporto (PT)

( * ) Notice: Subject to any disclaimer, the term of this patent is extended or adjusted under 35 U.S.C. 154(b) by 0 days.

(21) Appl. No.: 15/004,670

(22) Filed: Jan. 22, 2016

(65) Prior Publication Data
US 2016/0150451 A1 May 26, 2016

Related U.S. Application Data

(63) Continuation of application No. PCT/IB2014/063388, filed on Jul. 24, 2014.

(30) Foreign Application Priority Data

Aug. 5, 2013 (PT) .................................... 107104

(51) Int. Cl.
*H04W 4/00* (2009.01)
*H04W 36/14* (2009.01)
(Continued)

(52) U.S. Cl.
CPC ............. *H04W 36/14* (2013.01); *H04W 36/30* (2013.01); *H04W 36/32* (2013.01);
(Continued)

(58) Field of Classification Search
CPC ... H04W 36/14; H04W 36/30; H04W 36/32; H04W 84/22; H04W 84/005; H04W 84/12; H04W 84/042; H04W 88/10
USPC ........................................................ 370/338
See application file for complete search history.

(56) References Cited

U.S. PATENT DOCUMENTS 6,721,632 B2    4/2004   Fallenstein
6,785,511 B1    8/2004   Hengeveld et al.
(Continued)

FOREIGN PATENT DOCUMENTS

EP         1 189 469       3/2002
EP         2146486         1/2010
WO     WO 2012012836     2/2012

OTHER PUBLICATIONS

Cheng et al; "Vehicular WiFi Offloading: Challenges and Solutions"; Oct. 27, 2013.*
(Continued)

*Primary Examiner* — Thai Hoang
(74) *Attorney, Agent, or Firm* — Leason Ellis LLP

(57) ABSTRACT

Wireless network data router for a vehicle, and operating method thereof, comprising: a multi-connection interface for wireless access in vehicular environments, herewith WAVE; a wireless local area network, herewith Wi-Fi, interface; a mobile network data interface; a downlink data connection for the vehicle and/or users in the vehicle and its vicinity; a data processing unit for routing data between said interfaces; wherein the data processing unit is configured to: calculate a score for each reachable network on the WAVE, Wi-Fi and mobile network interfaces; switch the uplink connection of the wireless network data router to the reachable network with the best score. Also a wireless network data router for vehicles for connecting vehicles to the Internet through a multi-network device, said router being a mobile router suitable to form a mesh network of connected vehicles, wherein the router is arranged for using parked cars for redistributing Wi-Fi signal from fixed hotspots.

19 Claims, 11 Drawing Sheets

(51) Int. Cl.
*H04W 36/30* (2009.01)
*H04W 36/32* (2009.01)
*H04W 84/22* (2009.01)
*H04W 84/00* (2009.01)
*H04W 88/10* (2009.01)
*H04W 84/12* (2009.01)
*H04W 84/04* (2009.01)

(52) U.S. Cl.
CPC ........ *H04W 84/005* (2013.01); *H04W 84/042* (2013.01); *H04W 84/12* (2013.01); *H04W 84/22* (2013.01); *H04W 88/10* (2013.01)

(56) References Cited

U.S. PATENT DOCUMENTS

| | | | |
|---|---|---|---|
| 7,003,261 B2 | 2/2006 | Dietz et al. | |
| 7,062,239 B2 | 6/2006 | Inoue | |
| 7,176,810 B2 | 2/2007 | Inoue | |
| 7,221,968 B2 | 5/2007 | Oouchi | |
| 7,430,218 B2 | 9/2008 | Lee et al. | |
| 7,433,773 B2 | 10/2008 | Tengler et al. | |
| 7,554,435 B2 | 6/2009 | Tengler et al. | |
| 7,609,174 B2 | 10/2009 | Tengler et al. | |
| 7,734,803 B2 | 6/2010 | Laberteaux et al. | |
| 7,764,978 B1 | 7/2010 | West | |
| 7,804,423 B2 | 9/2010 | Mudalige et al. | |
| 7,970,540 B2 | 6/2011 | Laberteaux et al. | |
| 7,983,206 B2 | 7/2011 | Tian | |
| 8,018,888 B1 | 9/2011 | Fuller et al. | |
| 8,159,991 B1 | 4/2012 | Fuller et al. | |
| 8,180,297 B2 | 5/2012 | Hesse et al. | |
| 8,274,405 B2 | 9/2012 | Bos | |
| 8,279,082 B2 | 10/2012 | Machida | |
| 8,280,583 B2 | 10/2012 | Stählin et al. | |
| 8,299,940 B2 | 10/2012 | Kinoshita | |
| 8,300,564 B2 | 10/2012 | Grimm et al. | |
| 8,358,221 B2 | 1/2013 | Ueno et al. | |
| 8,514,825 B1* | 8/2013 | Addepalli | H04W 4/046 370/338 |
| 9,241,305 B2* | 1/2016 | Cui | H04W 48/18 |
| 2005/0083866 A1 | 4/2005 | Kubotani et al. | |
| 2007/0030857 A1 | 2/2007 | Fulknier et al. | |
| 2007/0083318 A1 | 4/2007 | Parikh | |
| 2008/0136670 A1 | 6/2008 | Tengler et al. | |
| 2009/0170434 A1 | 7/2009 | Tengler et al. | |
| 2010/0019891 A1 | 1/2010 | Mudalige | |
| 2010/0136909 A1 | 6/2010 | Nagatomo | |
| 2010/0195608 A1 | 8/2010 | Ishizu et al. | |
| 2010/0198455 A1 | 8/2010 | Hotta et al. | |
| 2010/0234071 A1* | 9/2010 | Shabtay | H04B 7/0408 455/562.1 |
| 2010/0248619 A1 | 9/2010 | Senarath et al. | |
| 2010/0261428 A1 | 10/2010 | Goto | |
| 2010/0311335 A1 | 12/2010 | Durand et al. | |
| 2010/0318261 A1 | 12/2010 | Nagatomo | |
| 2011/0010443 A1 | 1/2011 | Nagatomo | |
| 2011/0029232 A1 | 2/2011 | Hattori et al. | |
| 2011/0034201 A1 | 2/2011 | Hamada et al. | |
| 2011/0095908 A1 | 4/2011 | Nadeem et al. | |
| 2011/0165896 A1 | 7/2011 | Stromberg et al. | |
| 2011/0196969 A1 | 8/2011 | Tarte et al. | |
| 2011/0298636 A1 | 12/2011 | Sekiguchi | |
| 2012/0039248 A1 | 2/2012 | Schneider et al. | |
| 2012/0106544 A1 | 5/2012 | Yousefi et al. | |
| 2012/0108163 A1 | 5/2012 | Bai et al. | |
| 2012/0158820 A1 | 6/2012 | Bai et al. | |
| 2012/0163275 A1 | 6/2012 | Kim et al. | |
| 2012/0225681 A1 | 9/2012 | Hung et al. | |
| 2012/0239294 A1 | 9/2012 | Stählin et al. | |
| 2012/0275445 A1 | 11/2012 | Karlsson | |
| 2012/0317161 A1 | 12/2012 | Bai et al. | |
| 2013/0002414 A1 | 1/2013 | Konet et al. | |
| 2013/0022031 A1 | 1/2013 | Sivertsen | |
| 2013/0051251 A1 | 2/2013 | Wang et al. | |
| 2013/0157711 A1 | 6/2013 | Lee et al. | |
| 2013/0210379 A1* | 8/2013 | Cloutier | H04W 12/08 455/405 |
| 2015/0207860 A1* | 7/2015 | Kan | H04W 48/18 709/201 |
| 2016/0057635 A1* | 2/2016 | Liu | G07C 5/0808 701/32.3 |

OTHER PUBLICATIONS

Na et al; "Mitigating WiFi Interference to Improve Throughput for In-Vehicle Infotainment Networks"; IEEE, Feb. 2016.*
Cottingham, David; "Vehicular wireless communication"; Jan. 2009.*
Majlesi A et al: "An adaptive fuzzy logic based handoff algorithm for hybrid networks", Signal Processing, 2002 6$^{th}$ International Conference on Aug. 26-30, 2002, Piscataway, NJ, USA, IEEE, vol. 2, Aug. 26, 2002, pp. 1223-1226, XP010627753, ISBN: 978-0-7803-7488-1.

* cited by examiner

METHOD AND APPARATUS FOR MULTI-NETWORK COMMUNICATION IN VEHICULAR NETWORKS

TECHNICAL FIELD

The field of the present disclosure regards vehicular networks, i.e., technology that normally uses moving cars as nodes in a network to create a mobile network, in particular a method and device for connecting vehicles to the Internet based upon a mesh network of vehicles connected to some infrastructure.

BACKGROUND ART

The field of the present disclosure regards vehicular networks, i.e., technology that normally uses moving cars as nodes in a network to create a mobile network.

In the near future, it is expected that most vehicles will be able to access the Internet either contacting the Road-Side Units (RSUs) that compose the vehicular infrastructure (using IEEE 802.11p or IEEE 802.11a/b/g/n) or through cellular networks (3G and 4G). RSUs can also be used to improve connectivity and communication between vehicles.

In this context, several technologies were already proposed (and they are referenced at the end of this document) that can be used to improve the vehicular communication infrastructure: (i) several ones provide an in-vehicle Wi-Fi or 3G interface that is able to connect to a computer/server/hotspot/base station to provide Internet access to the vehicle's occupants; (ii) others define strategies to establish multi-hop vehicle-to-vehicle (V2V) and/or vehicle-to-Infrastructure (V2I) communications using either DSRC 5.9 GHz or cellular technologies to enhance transportation safety and efficiency; (iii) others allow vehicles to be equipped both with DSRC 5.9 GHz, Wi-Fi and/or 3G interfaces, but they do not always provide the best mechanisms for multiple network contexts. In particular, even if the existing QoS solutions are adapted to vehicular networks these do not provide results as advantageous as the present disclosure in vehicular networks as these do not provide the presently disclosed methods. For example, QoS methods usually involve load balancing methods and contention/buffer overflow minimizations that are not apt solutions for vehicular networks.

SUMMARY

Method and apparatus for connecting vehicles to the Internet through a multi-technology network device, a mobile router that is able to form a mesh network of vehicles connected to the infrastructure.

The vehicles connect between themselves to perform Wireless Access in Vehicular Environments (WAVE) through Dedicated Short Range Communications (DSRC), in particular the DSRC 5.9 GHz, which includes the standard IEEE 802.11p, and connect to the infrastructure through cellular or wireless connections. The choice between the active technologies is performed through a connection manager module that is able to seamlessly switch between technologies according to the position of the reachable networks and their quality, the number of nodes connected to each network, number of hops to reach the Internet, expected contact time, and/or user and operator price preferences.

An embodiment includes using parked cars for redistributing Wi-Fi signal from fixed hotspots.

The vehicular technology is compliant with the current vehicular communication system standards. It supports multi-channel seamless communication with one single radio, and synchronization through GPS. The device platform is based on a single-board computer, the several network interfaces and antennas, and an integrated GPS.

It is disclosed a wireless network data router for a vehicle comprising:
- a multi-connection interface for wireless access in vehicular environments, herewith WAVE;
- a wireless local area network, herewith Wi-Fi, interface;
- a mobile network data interface;
- a downlink data connection interface for the vehicle and/or users in the vehicle and its vicinity;
- data processing unit for routing data between said interfaces;
- wherein the data processing unit is configured to:
  - calculate a score for each reachable network on the WAVE, Wi-Fi and mobile network interfaces;
  - switch an uplink connection of the wireless network data router to the reachable network with the best score.

In an embodiment, the score is a weighted scoring calculated from the parameters: signal strength, number of hops to reach a wired infrastructure, node density, expected contact time.

In an embodiment, the weighted scoring is a hierarchical weighted AHP score, wherein the parameters of number of hops to reach a wired infrastructure, of node density, and of expected contact time are grouped in an AHP criteria group herewith referred as backdrop parameter group.

In an embodiment, the expected contact time between the network data router of a vehicle i and a reachable network j of another vehicle or Wi-Fi hotspot or RSU, is derived from:

$$\frac{-(a \cdot c + b \cdot d) \pm \sqrt{(c^2 + d^2) \cdot R^2 + (b \cdot c - a \cdot d)^2}}{c^2 + d^2}$$

wherein, $a = x_j(0) - x_i(0)$ $b = y_j(0) - y_i(0)$ $c = v_j \cdot \cos(\theta_j) - v_i \cdot \cos(\theta_i)$ $d = v_j \cdot \sin(\theta_j) - v_i \cdot \sin(\theta_i)$ and wherein x and y are, respectively, the positions of the vehicles or Wi-Fi hotspots or RSUs in the Cartesian coordinate system, v is the speed of vehicles, which is zero in case of Wi-Fi hotspots or RSUs, wherein θ is the angle formed with the road in which the vehicle is traveling, and R is the radio communication range of the WAVE or Wi-Fi connections.

In an embodiment, the density parameter is calculated by dividing the number of connected nodes by the number of maximum nodes in a reachable network.

In an embodiment, the scoring weights are differentiated according to the current vehicle speed.

In an embodiment, the scoring weights are differentiated according to three classes of current vehicle speed: stopped or moving below a first predetermined speed; moving above a first predetermined speed and below a second predetermined speed; or moving above a second predetermined speed; where the first predetermined speed is below the second predetermined speed.

In an embodiment, the weighting scores are differentiated according to two classes of current vehicle speed—stopped or moving under a first predetermined speed; moving over a first predetermined speed.

In an embodiment, the score is a fuzzy logic weighted scoring.

In an embodiment, the weighted scoring further includes a weight specific to each of the interfaces.

In an embodiment, when the car is parked, the data processing unit is configured not to use the mobile network data interface.

In an embodiment, when the car is parked, the data processing unit is configured to adjust the mobile network data interface weight such that the mobile network data interface will not be selected.

In an embodiment, the data processing unit is configured to refrain from switching the uplink connection of the wireless network data router to the reachable network with the best score until the sore of the reachable network with the best score is higher than the current network score by a predetermined hysteresis threshold.

In an embodiment, the multi-connection interface for wireless access in vehicular environments, WAVE, is a DSRC interface, in particular comprising IEEE 802.11p.

In an embodiment, the Wi-Fi interface is an IEEE 802.11a/b/g and/or 802.11n interface.

In an embodiment, the mobile network data interface is a 3G, 4G, LTE, Advanced LTE and/or WiMax interface.

In an embodiment, the downlink data connection for the vehicle and/or users in the vehicle and its vicinity is a wireless local area network, in particular Wi-Fi or Bluetooth.

In an embodiment, the scoring weights have been obtained my optimizing, for a number of simulation scenarios, the fitness function:

$$F = 1 - \frac{D_{tx} - D_{rx}}{D_{tx}} \cdot \alpha - \frac{D_{rx}^{3G}}{D_{tx}} \cdot \beta - N_h \cdot \gamma$$

where Drx represents the total data received, the Dtx the total data transmitted, D_3G_rx represents the data received by cellular networks, and Nh represents the number of handovers performed, and where alpha α, beta β and gamma γ are coefficient weights of the fitness function F and said coefficient weights are variable according to the vehicle motion.

In an embodiment, the classes of vehicle speed and/or connection hysteresis threshold have also been obtained by the same optimization of said fitness function.

In an embodiment, the downlink data connection interface is the same interface as the wireless local area network interface.

It is also described a method of using of any of the previously described wireless network data routers on a vehicle.

It is also described a method of using of any of the previously described wireless network data routers as a road-side unit.

It is also described a wireless network data router for vehicles for connecting vehicles to the Internet infrastructure through a multi-technology network device, wherein said router is a mobile router suitable to form a mesh network of vehicles connected to the infrastructure, wherein the router is arranged for using parked cars for redistributing Wi-Fi signal from fixed hotspots.

In an embodiment, the router is arranged such that said vehicles connect between themselves to perform Wireless Access in Vehicular Environments, WAVE, through Dedicated Short Range Communications, DSRC, and connect to the infrastructure through cellular or wireless connections; wherein the router is arranged to choose between active technologies through a connection manager that is able to seamlessly switch between technologies according to the position of reachable networks and their quality.

It is also described a method of operating a wireless network data router for a vehicle, said router comprising:
  a multi-connection interface for wireless access in vehicular environments, herewith WAVE;
  a wireless local area network, herewith Wi-Fi, interface;
  a mobile network data interface;
  a downlink data connection for the vehicle and/or users in the vehicle and its vicinity;
  data processing unit for routing data between said interfaces;
  wherein the method comprises the steps of:
  calculating a score for each reachable network on the WAVE, Wi-Fi and mobile network interfaces;
  switching an uplink connection of the wireless network data router to the reachable network with the best score.

In an embodiment, the score is a weighted scoring calculated from parameters: signal strength, number of hops to reach a wired infrastructure, node density, expected contact time.

In an embodiment, the weighted scoring is a hierarchical weighted AHP score, wherein the parameters of number of hops to reach a wired infrastructure, of node density, and of expected contact time are grouped in an AHP criteria group herewith referred as backdrop parameter group.

In an embodiment, the expected contact time between the network data router of a vehicle i and a reachable network j of another vehicle or Wi-Fi hotspot or RSU, is derived from:

$$\frac{-(a \cdot c + b \cdot d) \pm \sqrt{(c^2 + d^2) \cdot R^2 + (b \cdot c - a \cdot d)^2}}{c^2 + d^2}$$

wherein, $a = x_j(0) - x_i(0)$ $b = y_j(0) - y_i(0)$ $c = v_j \cos(\theta_j) - v_i \cos(\theta i)$ $d = v_j \sin(\theta_j) - v_i \sin(\theta i)$ and wherein x and y are, respectively, the positions of the vehicles or Wi-Fi hotspots or RSUs in the Cartesian coordinate system, v is the speed of vehicles, which is zero in case of Wi-Fi hotspots or RSUs, wherein θ is the angle formed with the road in which the vehicle is traveling, and R is the radio communication range of the WAVE or Wi-Fi connections.

In an embodiment, the density parameter is calculated by dividing the number of connected nodes by the number of maximum nodes in a reachable network.

In an embodiment, the scoring weights are differentiated according to the current vehicle speed.

In an embodiment, the scoring weights are differentiated according to three classes of current vehicle speed: stopped or moving below a first predetermined speed; moving above a first predetermined speed and below a second predetermined speed; or moving above a second predetermined speed; where the first predetermined speed is below the second predetermined speed.

In an embodiment, the weighting scores are differentiated according to two classes of current vehicle speed—stopped or moving under a first predetermined speed; moving over a first predetermined speed.

In an embodiment, the score is a fuzzy logic weighted scoring.

In an embodiment, the weighted scoring further includes a weight specific to each of the interfaces.

In an embodiment, when the car is parked, the data processing unit does not use the mobile network data interface.

In an embodiment, the data processing unit adjusts the mobile network data interface weight such that the mobile network data interface is not selected.

In an embodiment, the data processing unit refrains from switching the uplink connection of the wireless network data router to the reachable network with the best score until the sore of the reachable network with the best score is higher than the current network score by a predetermined hysteresis threshold.

In an embodiment, the multi-connection interface for wireless access in vehicular environments, WAVE, is a DSRC interface, in particular comprising IEEE 802.11p.

In an embodiment, the Wi-Fi interface is an IEEE 802.11a/b/g and/or 802.11n interface.

In an embodiment, the mobile network data interface is a 3G, 4G, LTE, Advanced LTE and/or WiMax interface.

In an embodiment, the downlink data connection for the vehicle and/or users in the vehicle and its vicinity is a wireless local area network, in particular Wi-Fi or Bluetooth.

In an embodiment, the scoring weights have been obtained my optimizing, for a number of simulation scenarios, the fitness function F:

$$F = 1 - \frac{D_{tx} - D_{rx}}{D_{tx}} \cdot \alpha - \frac{D_{rx}^{3G}}{D_{tx}} \cdot \beta - N_h \cdot \gamma$$

where Drx represents the total data received, the Dtx the total data transmitted, D_3G_rx represents the data received by cellular networks, and Nh represents the number of handovers performed, and where alpha $\alpha$, beta $\beta$ and gamma $\gamma$ are coefficient weights of the fitness function F and said coefficient weights are variable according to the vehicle motion.

In an embodiment, the classes of vehicle speed and/or connection hysteresis threshold have been obtained by the same optimization of said fitness function.

It is also described non-transitory machine readable medium comprising program instructions for operating a wireless network data router for a vehicle, the program instructions including instructions executable to carry out any of the above methods.

GENERAL DESCRIPTION

It is disclosed an inter-technology, i.e. multi-network, device to build a vehicular mesh: this is typically a small device that can turn any vehicle into a mobile hotspot. The device has multiple wireless interfaces, including standard IEEE 802.11a/b/g/n Wi-Fi, DSRC 5.9 GHz interface for WAVE communications (Vehicle-to-Vehicle—V2V, and Vehicle-to-Infrastructure—V2I), 3G or 4G/LTE. With such device, vehicles can access to a variety of Internet-based applications for vehicle drivers and passengers, such as driver assistance, traffic information and infotainment.

The device is capable to provide an ubiquitous Internet access for the vehicles' occupants through a direct connection to a Wi-Fi hotspot or 3G base station, or even by establishing V2V and V2I communications through DSRC 5.9 GHz, in order to access to a distant Wi-Fi hotspot, thus increasing its range of coverage.

With the integration of an intelligent connection manager, the interface used for vehicular Internet access can be dynamically adapted to the availability and quality of the networks, being also able to reduce the networking access and handover delays. Therefore, in this technology, it is defined an inter-technology, i.e. multi-network. device, along with its main hardware components and key functionalities, in order to form a vehicular mesh network with both vehicles and RSUs to provide a ubiquitous and adaptive Internet access for vehicles' occupants.

DSRC 5.9 GHz is a set of standards constituted by institute of Electrical and Electronics Engineers (IEEE) 802.11p and IEEE 1609.x/(Wireless Access in Vehicular Environment (WAVE)).

The IEEE 1609.4 is part of the WAVE, responsible for the description of the MAC sublayer functionalities. It introduces the Control CHannel (CCH) and Service CHannel (SCH) concept, using the communication concept outside of the context of a BSS described by IEEE 802.11p. The Network and transport layers of the OSI model for WAVE devices are described in IEEE 1609.3.

The WAVE standards specify that the device must listen to a Control and emergency CHannel (CCH) periodically, even though it is communicating in one of the other Service CHannels (SCH). According to IEEE 802.11p, the CCH is used for safety-critical message dissemination and must be tuned for at least 50 ms each 100 ms. Two approaches exist to solve this technical problem: having a radio permanently tuned in the CCH or switching channels each 50 ms. The second approach imposes a severe temporal synchronization, so that all the nodes switch to the same channel at the same time. To achieve this synchronization, it may make use of a GPS device integrated in the router, which provides time synchronization typically up to 100 ns. A GPS module provides a Pulse Per Second (PPS) signal that, as the name suggests, generates a pulse at the beginning of each second. When connected to a General Purpose Input Output (GPIO) port in a control module on the SBC, this signal can be used to synchronize the switching process, according to FIG. 1, which describes the operation of this block.

The GPS PPS synchronization process starts with the detection of the PPS signal. If it is detected, block (16), which ensures the time estimation through a Kalman filter, is enabled. This block is essential, since the device uses an external time source, thus needs an interface to adjust the internal clock source, guaranteeing that it behaves monotonically. Being a recursive optimal estimator, the Kalman filter adjusts (14) by adding a variable time K to the waiting time, which introduces minimal corrections in the dock, until it reaches an estimated value with the minimal average error achievable. To achieve global synchronization among all communicating nodes, DSRC specifies that the device must be tuned in the CCH in the beginning of each second, as shown by (15). After the 50+K ms of communication in this channel have expired, the presence of the PPS signal is verified again. If it is not detected, the device is tuned to the other channel, and the process is repeated.

The device architecture contains a connection manager that allows the connected vehicles to form a reliable mesh network, while enabling each device to find and select the best connection to the infrastructure, be it a local Wi-Fi hotspot, another vehicle connected to the mesh, or to the cellular network, if no other option is available.

Each device can be either a Road-Side Unit (RSU) or an On-Board Unit (OBU) operating in the car. Both the RSUs and OBUs may preferably have the same hardware, except for the antennas (the RSUs may preferably have higher gain antennas). The enclosure may also be changed, depending on where the unit is to be placed. According to a preferred embodiment, the device is composed by (see FIG. 2):

Single-Board Computer (SBC). It contains the data processing unit that is responsible to:
  provide the means to inter-connect all the device modules;
  coordinate all the access technology interfaces-connection manager;
  establish an in-vehicle Wi-Fi hotspot for the occupants.
Dedicated Short Range Communications (DSRC) Interface 5.9 GHz. A mini-PCI 802.11p compliant wireless interface is connected in one of the mini-PCI slots of the SBC. This interface uses the Atheros AR5414 chipset, which allows the use of the ath5 k driver, and it operates in the 5.850 GHz-5.925 GHz frequency.
Wi-Fi interface (IEEE 802.11a/b/g/n). A standard 802.11a/b/g/n wireless interface is connected to one of the USB ports of the SBC. This card is intended to provide communication between the OBU and the user devices, as well as to opportunistically connect to Wi-Fi hotspots available from the road.
3G Interface. It is connected to another USB port of the SBC, being used whenever no other connection type is available to communicate with the infrastructure.
GPS receiver. It is integrated with the IEEE 802.11p interface in the SBC to provide multi-channel synchronization. Synchronization to Universal Time Coordination (UTC) is required for those DSRC devices switching channels on channel interval boundaries, which may be derived from GPS, as described above.
Antennas for each device.

The inter-technology, i.e. multi-network, device enables Internet access for vehicles without requiring cellular connections, and through the establishment of multi-hop DSRC 5.9 GHz connections, it allows the increase in 10 times of the range of coverage of traditional Wi-Fi hotspots. Moreover, the integration between the IEEE 802.11p and GPS modules leads to the possibility to perform the fast wireless channel switching (between the control and service channels) with only one radio interface. Additionally, the intelligent connection manager allows the automatic selection of the best network and technology for Internet access, both considering the networks' quality or services' requirements, while decreasing the delays for network access and for inter-network/technology handover. In summary, this device can be incorporated in vehicles and RSUs to increase the performance of a city-scale mesh network, in order to allow a plethora of parked or mobile vehicles to establish an optimal Internet connection with an external Wi-Fi hotspot or cellular base station, thus providing high-quality Internet access for the vehicles' occupants.

Furthermore, as the device meshes Wi-Fi and WAVE together, each vehicle retransmits Wi-Fi (e.g. for its own occupants and third parties) and retransmits WAVE (e.g. for other vehicles). A device according to the disclosure will normally have plenty of connection possibilities and the difficulty will lie in choosing among several similar networks which one is best at that time for the purpose.

Several performance results obtained through real prototypes already showed the potential of the architecture and the main functionalities of the inter-technology, i.e. multi-network, device.

DESCRIPTION OF THE FIGURES

The following figures provide preferred embodiments for Illustrating the description and should not be seen as limiting the scope of disclosure.

DETAILED DESCRIPTION

Figure 1:
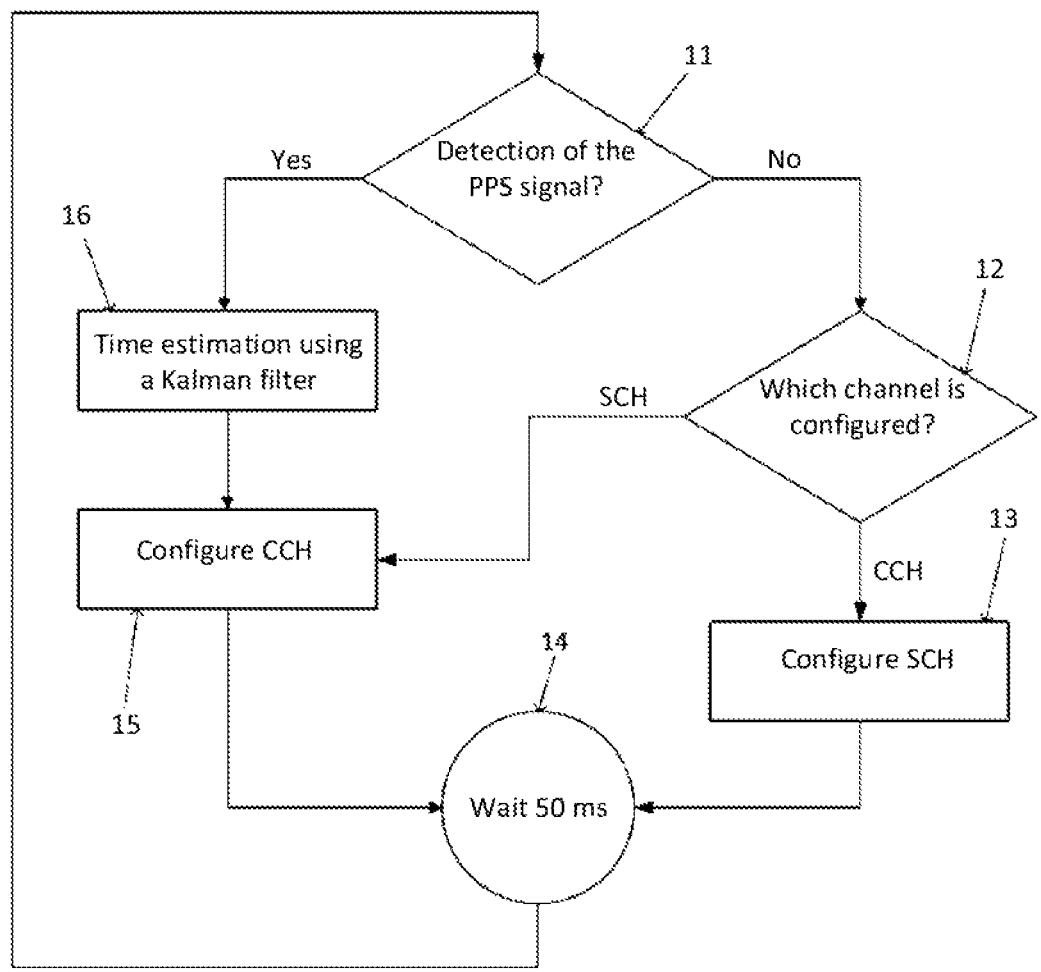
FIG. 1 shows a schematic representation of the algorithm that can be used to impose a temporal synchronization using GPS PPS.

FIG. 1 shows the algorithm used to Impose a temporal synchronization, so that all the nodes switch to the same channel at the same time. This synchronization concerns the IEEE 802.11p standard which states that the Control and Emergency CHannel, used for safety-critical message dissemination, must be tuned for at least 50 ms each 100 ms.

Figure 2:
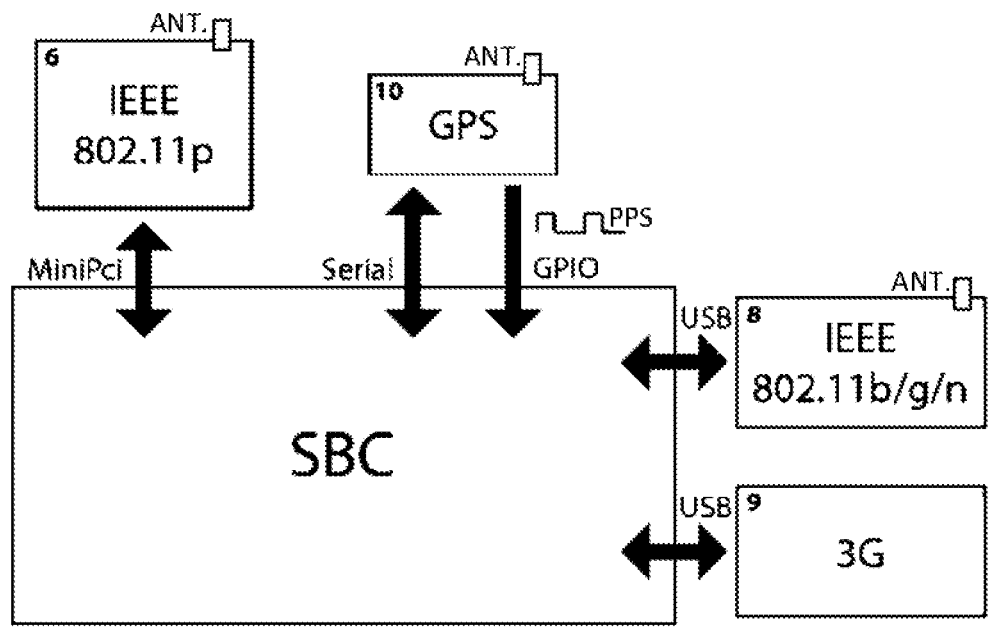
FIG. 2 shows a schematic representation of the components of an embodiment according to of the disclosure.

FIG. 2 describes the components of the communication unit according to an device according to embodiments of the disclosure.

Figure 3:
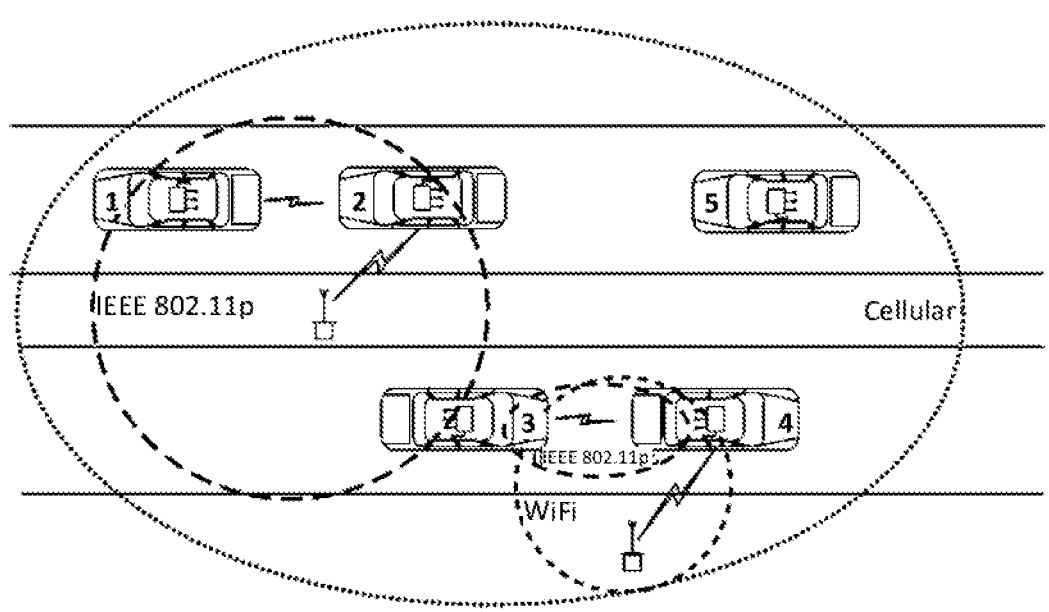
FIG. 3 shows a schematic representation of a use case, where vehicles select the available technologies to communicate, according to a predefined preference.

FIG. 3 shows a possible use case, where the vehicles have a device according to the disclosure and select the available technologies to communicate, according to a predefined preference. A first vehicle (1) is communicating with a second vehicle (2) through IEEE 802.11p, while the second vehicle (2) is also communicating with an RSU (6). A user in the first vehicle (1) could be using vehicular network applications, such as multi-player gaming, or even accessing its e-mail, through the second vehicle (2), which in turn can provide access to the Internet through the roadside gateway. This type of connection can be named as multi-hop, since the node providing internet to the user is not directly connected to the internet but using another node to reach the network. A third vehicle (3) is also communicating with a fourth vehicle (4) through IEEE 802.11p, while the fourth vehicle (4) is using the Wi-Fi access point (7) as a gateway to the internet and relaying information from the third vehicle (3). Finally, a fifth vehicle (5) is neither in range of IEEE 802.11p networks nor Wi-Fi hotspots, thus uses cellular networks for communication.

Figure 4:
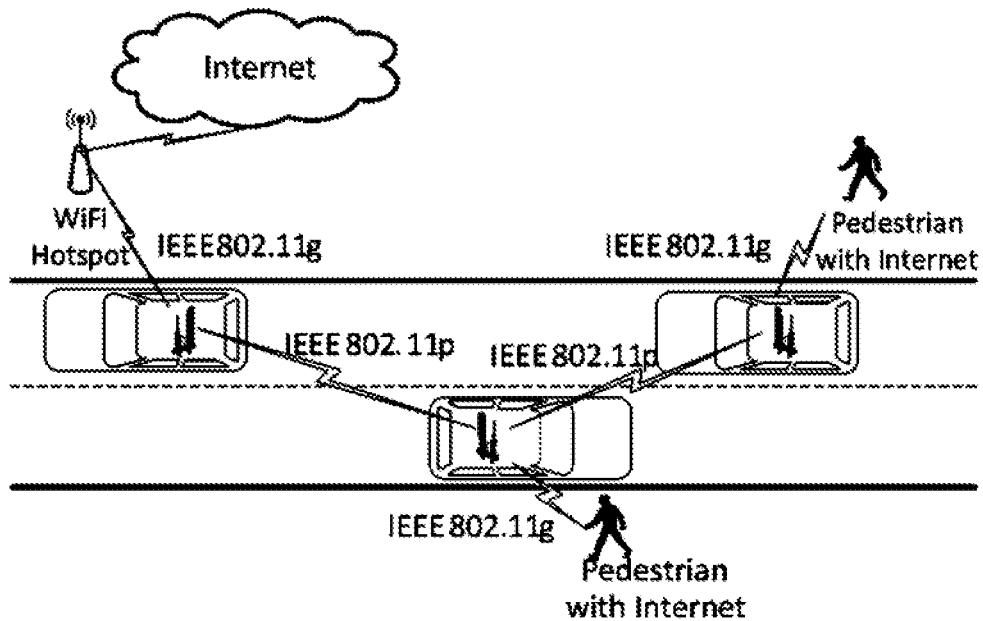
FIG. 4 shows a schematic representation of a vehicle sharing a Wi-Fi Internet connection to other vehicles by using DSRC 5.9 GHz and also to pedestrians in the range of those other vehicles.

All of the use cases presented in the previous paragraph can occur when the vehicle is moving or stopped, depending on its speed. However, there is one special case where one vehicle is required to be stopped, which is depicted in FIG. 4. Vehicle A is parked and connected to a Wi-Fi hotspot. Through its IEEE 802.11p interface, it provides internet connectivity to all the vehicles around, which can, in turn, become Wi-Fi hotspots and provide service the users around them. Furthermore, these vehicles can also provide service to other vehicles through IEEE 802.11p, cascading the network and reaching farther and farther nodes.

The connection manager can also be used to reduce the number of connections' breakdowns. In a specific scenario, there can be available two access technologies: Wi-Fi (e.g. IEEE 802.11a/b/g/n) and Wave (IEEE 802.11p). Therefore, the IEEE 802.11a/b/g/n, with a limited transmission range and a high bandwidth, is perfect for a parked vehicle, but highly Inefficient for a mobile vehicle, which is best served through IEEE 802.11p. This way, the connection manager can be responsible for selecting the IEEE 802.11a/b/g/n whenever the vehicle is parked or moving slowly, and the IEEE 802.11p when the vehicle starts moving faster. This can also comprise a combination of signal quality information with GPS speed information.

In FIG. 4, a Wi-Fi hotspot is connected to the Internet, with a vehicle in its communication range. Through the present approach, it is enabled the vehicle to share the Wi-Fi Internet connection to other vehicles by using DSRC 5.9 GHz and also to pedestrians in the range of these vehicles, in particular when those may not be in the range of any Wi-Fi hotspot. Following this strategy, it is extended the Wi-Fi communication range to users through the vehicular mesh network.

Figure 5:
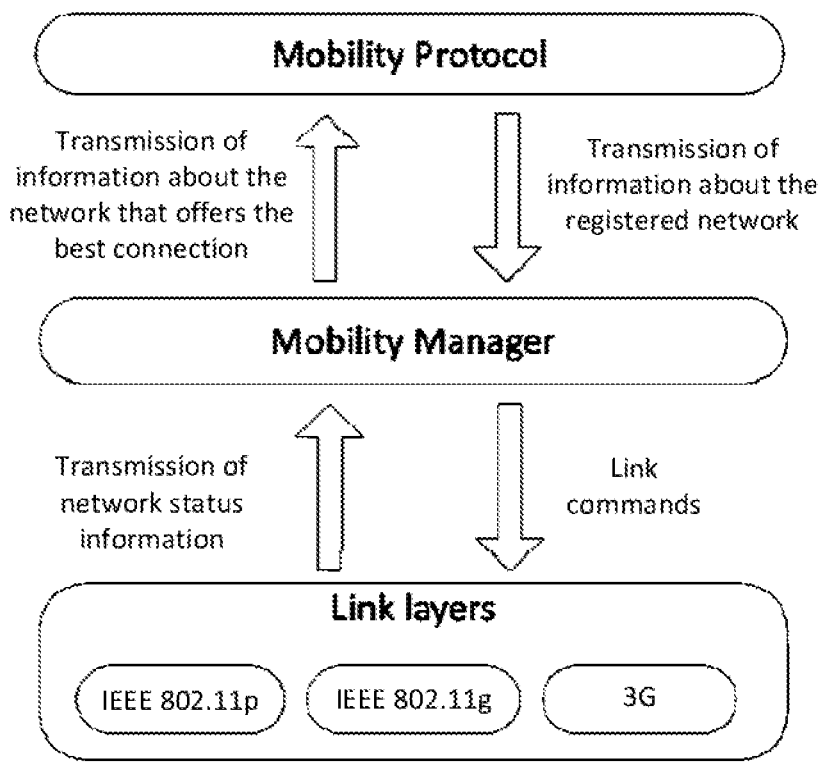
FIG. 5 shows a schematic representation of an architecture of the connection manager.
Figure 6:
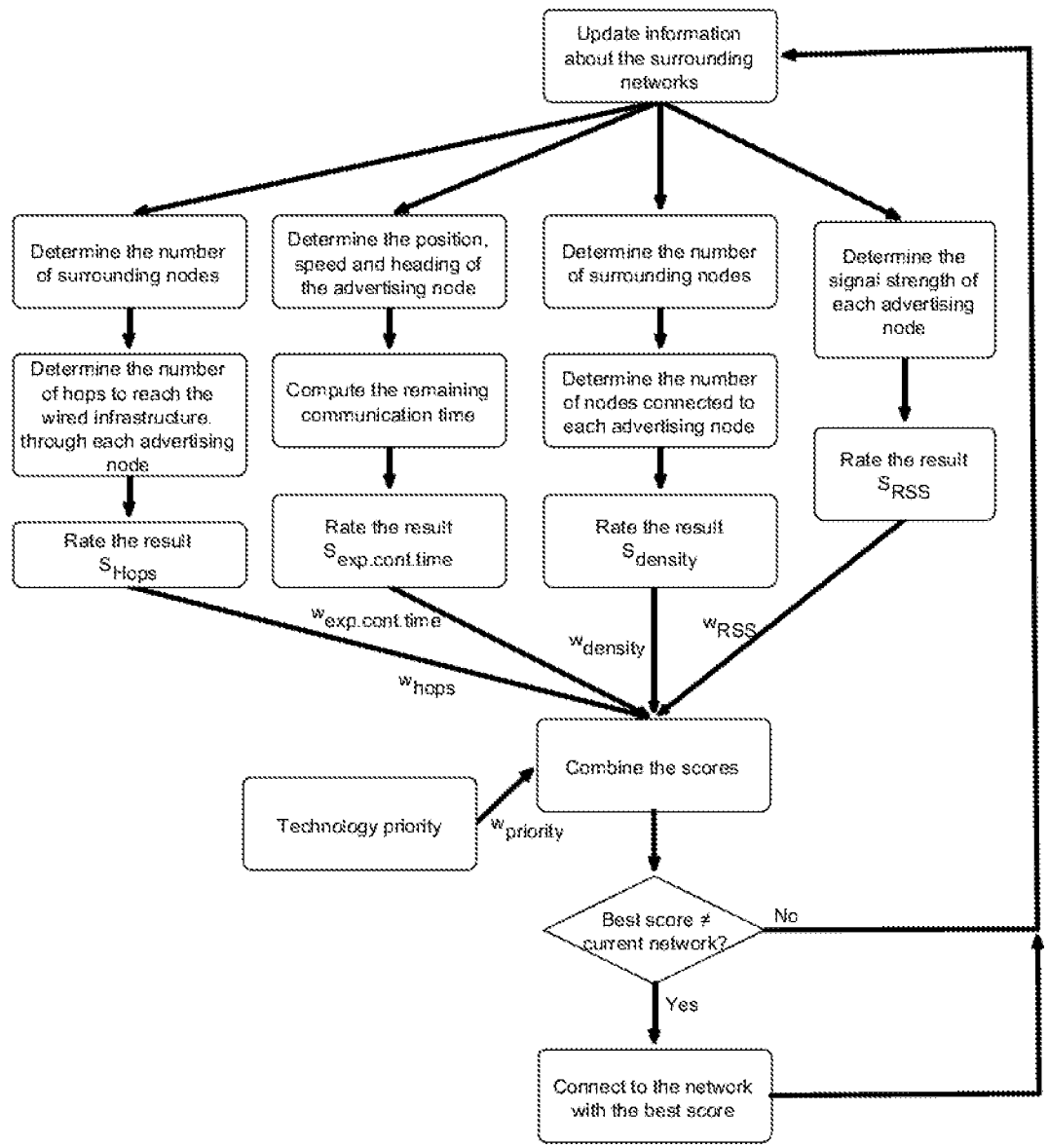
FIG. 6 shows a schematic representation of an operation method of the connection manager.

FIG. 5 describes the architecture of the connection manager according to an embodiment. Herein the connection manager is named mobility manager. It operates between a mobility protocol, which is used to provide seamless switching between technologies, and the link layers of all the technologies available, thus obtaining the necessary data from the network interfaces and being able to inform the mobility protocol timely, so that it can react to the changes in the network availability. A method of operation of the connection manager is shown in FIG. 6.

Figure 8:
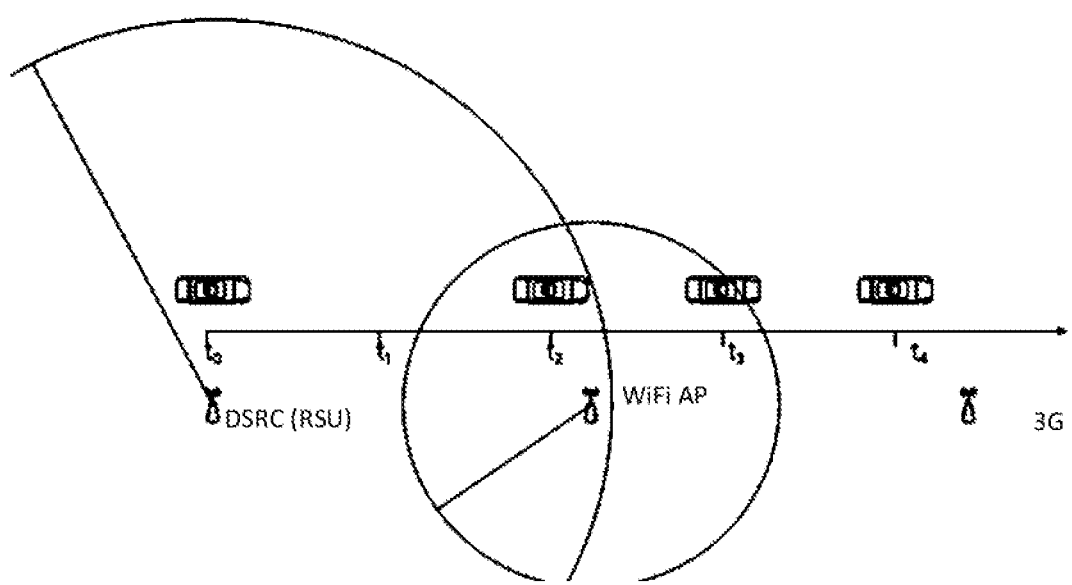
FIG. 8 shows a schematic representation of the connection manager in operation which is also a possible test case.

FIG. 8 shows an example of the connection manager in operation: a vehicle is communicating through the DSRC interface, when at $T=t_2$ it senses a Wi-Fi access point and, by way of the presently disclosed methods, 'predicts' that it is eventually going to lose connectivity on the DSRC interface. At this time, the connection manager takes the decision to switch communication to the Wi-Fi interface, until, at $T=t_3$, it detects that the signal of the Wi-Fi access point is decreasing too much. At this time, since no other access technology s available, the connection manager will decide to switch to the 3G network until it finds a preferred access technology.

Figure 9:
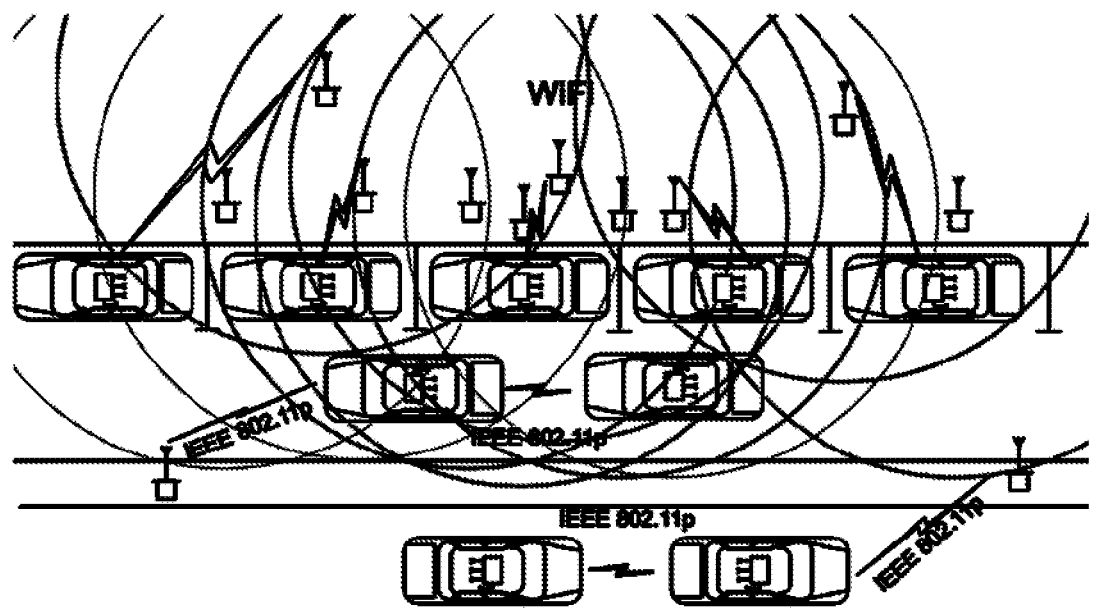
FIG. 9 shows a schematic representation of a use case where the connection manager reduces the connection interruptions.

FIG. 9 corresponds to a situation where the connection manager is essential to reduce the connection interruptions to a minimum. Two access technologies are available: IEEE 802.11a/b/g/n and IEEE 802.11p. With a limited range and a large bandwidth, a IEEE 802.11a/b/g/n connection is perfect for a parked vehicle, but highly inefficient for a passing vehicle, which is better served through IEEE 802.11p. Thus, the connection manager is able to select the IEEE 802.11a/b/g/n connection whenever the vehicle is parked or moving slowly, and IEEE 800.11p when it moves faster. This kind of intelligence of the connection manager is only achieved by using the received GPS information to detect if the vehicle is parked or not, as well as the signal quality of the available technologies.

In order to implement the preferred embodiments, the connection manager continuously evaluates the surrounding environment, gathering information to decide the best technology and network to connect at all times. While Wi-Fi network discovery is performed through a scanning phase, in which the radio hops through a whole range of channels, in IEEE 802.11p connection is detected through periodic messages broadcasted on the Control CHannel (CCH), therefore, the process is faster than in the former. Furthermore, WAVE specifies that these periodic messages must include the location parameters of the advertising node, thus this information is available to be used by the mechanism described below. The information collected includes the following:

Position and speed of the vehicle

Position and speed of the surrounding vehicles (collected through beacon-based broadcast messages sent by other vehicles)

Reachable networks, wherein for each network:

Received signal strength (RSS). This value is included in the beacons sent by surrounding Wi-Fi hotspots, or in the RSS field of the DSRC Wave Service Advertisements, WSAs, sent by surrounding vehicles. Please note that the RSS of the Wi-Fi hotspot is forwarded by each vehicle that is part of a multi-hop chain to reach it, being included in the Provider Service Context (PSC) field of the DSRC WSAs.

Position of the Wi-Fi hotspots (that can be known in advance) and information of the position, heading, direction and speed of surrounding vehicles (this information is acquired from the GPS interface and included in the Data Field of the DSRC Wave Short Messages, WSMs, sent by surrounding vehicles).

Number of hops to reach a wired infrastructure, assuming that Wi-Fi hotspots or RSUs are connected to the wired infrastructure (due to this reason, this value is only sent by vehicles, i.e. for Wi-Fi hotspots or RSUs it is one). This value is sent by surrounding vehicles, being updated by each vehicle that is part of a multi-hop chain to reach a Wi-F hotspot or RSU, and included in the Provider Service Context (PSC) field of the DSRC WSAs.

Number of connected nodes or density. This value is included in the beacons sent by surrounding Wi-Fi hotspots, and in the Data Field of the DSRC WSMs sent by surrounding vehicles.

All this information is combined and processed to produce evaluation metrics for each of the available networks for each technology, which will be used in the decision process.

From the speed of the vehicle and the surrounding vehicles, it is extracted the expected contact time of a hypothetical communication between the two nodes, which extrapolates the stability of the candidate connection. For determining the expected duration of the connectivity time between two vehicles, it will be assumed that vehicles travel with constant speed when required to determine the expected contact time between two vehicles. Thus, the following simple physical model is suitable:

$$X(t)=X(0)+v \cdot t,$$

where X is the object position, v is the speed and t is the time (this information is acquired from the GPS data).

Particularizing for a vehicle traveling in a road and using the notation presented for vehicle i yields:

$$\begin{cases} x_i(t) = x_i(0) + v_i \cdot \cos(\theta_i) \cdot t \\ y_i(t) = y_i(0) + v_i \cdot \sin(\theta_i) \cdot t \end{cases},$$

where x and y are, respectively, the positions of the vehicle in the cartesian coordinate system, and θ is the angle formed with the road in which the vehicle is traveling. The distance between vehicles i and j is given by the euclidean metric, as described by:

$$d_{i,j}(t) = \sqrt{\begin{array}{l} [(x_j(0) + vj \cdot \cos(\theta j) \cdot t) - (x_i(0) + vi \cdot \cos(\theta i) \cdot t)]^2 + \\ [(y_j(0) + vj \cdot \sin(\theta j) \cdot t) - (y_i(0) + vi \cdot \sin(\theta i) \cdot t)]^2 \end{array}} \quad (1)$$

Now, if it is assumed that vehicles can communicate within a range R, the following inequality must be true so that the vehicles is in the communication range of each other, $$d_{i,j}(t) \leq R$$

To determine the duration of the communication period, it is considered the limit situation where:

$$d_{i,j}(t)=R \quad (2)$$

To simplify the expression, the following variables are defined:

$$a=x_j(0)-x_i(0)$$

$$b=y_j(0)-y_i(0)$$

$$c=v_j \cos(\theta_j)-v_i \cos(\theta i)$$

$$d=v_j \sin(\theta_j)-v_i \sin(\theta i)$$

Combining (1), (2) and replacing the defined variables yields:

$$(a+c \cdot t)^2+(b+d \cdot t)^2=R^2 \quad (3)$$

Solving (3) for t, it is obtained the duration of the communication period:

$$t = \frac{-(a \cdot c + b \cdot d) \pm \sqrt{(c^2 + d^2) \cdot R^2 + (b \cdot c - a \cdot d)^2}}{c^2 + d^2}$$

Using this expression, it can be calculated the duration of an expected contact time between two vehicles giving their position, speed, direction and the radio range of DSRC 5.9 Ghz communications. When required to determine the expected contact time between a vehicle and a Wi-Fi hotspot or RSU, the model can be also applied by considering the position and the mean radio range of communication of the Wi-Fi hotspot or RSU. The mean value of radio range of communications per technology can be derived from the traces of a real testbed, being for example:

TABLE 1

Wi-Fi, DSRC and IEEE 802.11p mesh technologies range

|  | DSRC | Wi-Fi | Mesh |
|---|---|---|---|
| Range (m) | 450 | 100 | 140 |
| Frequency (GHz) | 5.9 | 2.4 | 5.9 |

The received signal strength is a traditional indicator of the link quality, but due to its variability in vehicular scenarios, its importance is usually reduced in this mechanism when compared to traditional selection mechanisms. The number of hops to reach the wired infrastructure and the available bandwidth of an access point allows to predict the quality of the connection, taking this factor into account in the final decision.

After processing the information, each of the alternatives is graded in the following categories, according to a comparison scale:

Received signal strength (RSS)

Backdrop

Number of hops to reach the wired infrastructure

Number of connected nodes or density. It is given more preference (or assigned a higher score) to the Wi-Fi hotspots or vehicles in which are connected a small number of nodes, in order to prevent bandwidth starvation due to an excessive number of nodes connecting to the same advertising node and promotes load balancing in the network.

Expected contact time

Optionally, a technology priority may be set, by defining weights for each of the different communication technologies. Incorporated in this technology priority, price preferences may, in particular, be taken into account whether set by the user or set by the operator. Typically, this carried out by defining a specific scoring weight for each of the interfaces present in the device according to the disclosure.

Figure 7:
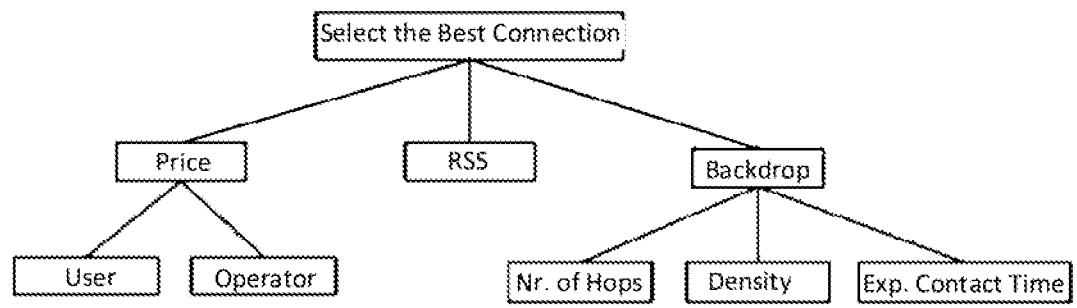
FIG. 7 shows an embodiment wherein the parameters that affect the decision of the connection manager are organized hierarchically like that of an Analytic Hierarchy Process (AHP) calculation.

After all the alternative reachable networks have been graded, the connection manager follows a hierarchical decision process for scoring said networks, like that of AHP, depicted in FIG. 7, whereby the lower-level criteria are influenced by the importance of their higher-level parent. The final result is calculated through the sum of all the criteria affected by a multiplicative factor. Thereby, the final contribution of the 'density', for instance, is:

Weighted Density=alpha*beta*density where alpha and beta are, respectively, the multiplicative factors of the 'backdrop' and the 'density'. These factors or parameters are straightforwardly obtained through optimization techniques involving network simulation of varied vehicle and usage scenarios. These scenarios vary depending on the actual number and location of moving and parked vehicles, users, road-side-units, layout of the streets, typical vehicle speeds, among others. By simulating actual usage scenarios, the parameters are thus optimized to produce the best possible results for these scenarios.

Alternatively, these factors can be obtained by setting initial values and improving said factors through logging actual usage over a period of time in a number of vehicles, preferably being large number of vehicles, and subsequent analysis for improvement. This can be automated, for example by using a local function optimization technique, able to improve an objective function of performance by incremental changes to said factors.

The speed of the node may be used to pre-select the set of multiplicative factors that are used in the decision process, since these will vary according to this parameter. The connection manager classifies the movement of the node into three classes, according to its speed:

Stopped/Moving very slowly

Moving

Moving Fast

The two speeds delimiting the three classes may be defined as part of the simulations above. The hierarchical scoring, including the optional variations defined by the delimiting speeds, may use fuzzy logic to compute the final score such that the score will change gradually when the speed changes through one of the speed thresholds.

Other methods may be used, for example, artificial neural networks, multivariate models, among others, to calculate the optimized scoring according to the variables and speeds defined above.

Optionally, only two classes may be used—e.g. moving vs. stopped/moving very slowly. Optionally, only one class may be used, thus the parameters being independent of vehicle speed.

The multiplicative factors are different for each of these classes in order to reflect the influence of each of the criteria for each of the classes of mobility. For instance, a vehicle traveling at high speed will tolerate using an expensive cellular technology to avoid performing large amounts of handovers, but, on the other hand, a parked vehicle will always prefer connecting to the cheapest technology, since that will not cause a decrease in the connection quality due to handovers.

The rating mechanism combined with the hierarchical decision process allow the prioritization of the available network connections, maximizing the quality of the connection through the minimization of the amount of handovers, together with the selection of the network that offers the best quality of service. At the same time, the utilization of this mechanism creates a load-balancing effect in the network, as nodes look at the actual number of nodes connected to each network (density) before connecting to it.

Figure 20:
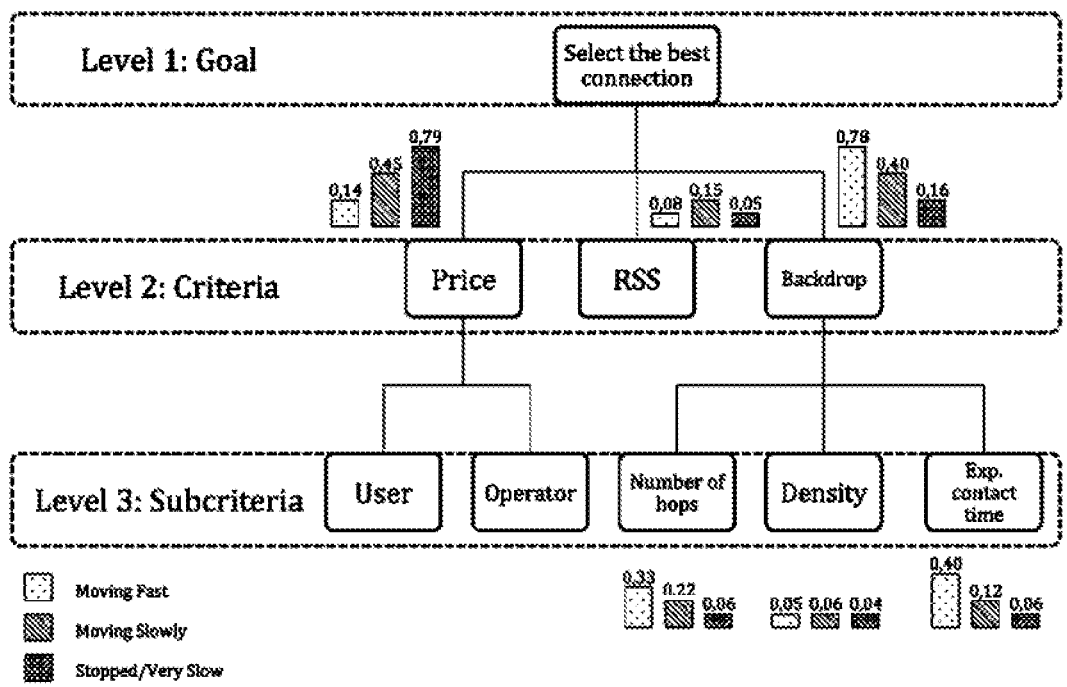
FIG. 20 describes an example of the considered speeds and the priorities determined by the connection manager.

As an example the following priorities and speeds were used: the speed of vehicles that move very slow is less than 5 m/s, the speed of moving vehicles ranges from 5 to 10 m/s, the speed of moving fast vehicles is higher than 10 m/s, and the optimal values of priorities for each category of speed are presented in FIG. 20.

According to an embodiment presented in FIG. 6, the preference of the available networks and technologies is ranked according to a score, calculated through:

$$S(t) = S_{RSS}(t)*w_{RSS} + S_{Exp.Cont.Time}(t)*w_{Exp.Cont.Time} + S_{Density}(t)*w_{Density} + S_{Hops}(t)*w_{Hops} + S_{Priority}(t)*w_{Priority}$$

where $S_{RSS}$ is determined from an evaluation of the signal strength received (RSS) from a network, and $S_{Exp.Cont.Time}$ is obtained from the location, speed, direction and radio range of communications of the advertising nodes, which allows to predict the remaining connection time to such node, as previously explained. Using this information, the node can avoid connecting to a very high quality, but short range network, preventing frequent network hopping. The number of nodes connected to the advertising node is included in the equation through $S_{Density}$ (this prevents bandwidth starvation due to an excessive number of nodes connecting to the same advertising node and promotes load balancing in the network), while $S_{Hops}$ represents the number of hops to reach the wired infrastructure. Finally, $S_{priority}$ defines the priority of each technology and may be tied to the cost per MB of each one, for instance. The weights (w) regulate the importance of each score towards the qualification of the network and may be adjusted according to the surrounding environment, using dynamic adaptation mechanisms. This is a simplification of the hierarchical scoring described above, because in this case all parameters are connected with the final score by a single weight. The two models are convertible based on the multiplication of the weighting parameters.

Figure 10:
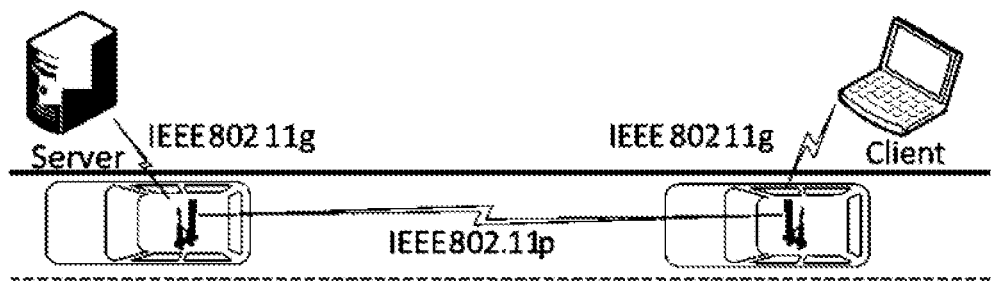
FIG. 10 presents a schematization of one of the testbeds used to perform some experiments that allowed obtaining a set of results that show the effectiveness of the present embodiments.

FIG. 10 presents a schematization of the testbed used to perform some experiments that allowed to obtain a set of results that show the effectiveness of the presented technology.

This testbed contains a server that emulates the Internet, and an OBU that connects to this server through IEEE 802.11a/b/g/n connection; it communicates with another OBU through IEEE 802.11p connections. These two OBUs also have the optional preferable capability of providing wireless communication to the passengers using the same IEEE 802.11a/b/g/n interface that connects to the Internet hotspot. To achieve this with only one IEEE 802.11a/b/g/n wireless card, it is considered the use of virtual interfaces attached to the same physical interface. This solution has a cost advantage, but it splits the resources by the two virtual interfaces. However, since the network bandwidth is not constrained by the 802.11a/b/g/n technology, this is not an issue in most scenarios.

Finally, since the OBU needs to redirect data through different interfaces in the multi-hop scenario, it is used routing, in particular a OS feature, Iptables, may be used that is responsible for masquerading the IP address (notice that, in vehicular networks there are not global IP addresses). In the case of IPv6, as IP masquerading is not necessary, since there is a large amount of IP addresses, and so the software running in the OBU automatically detects the use of IPv6, and disables the Iptables functionality.

To evaluate the end-user Quality of Service (QoS), the device obtains the throughput (using the transport protocols User Datagram Protocol, UDP, and Transmission Control Protocol, TCP), delay and packet loss in the communication between the Client and the Server represented in the FIG. 10.

Figure 11:
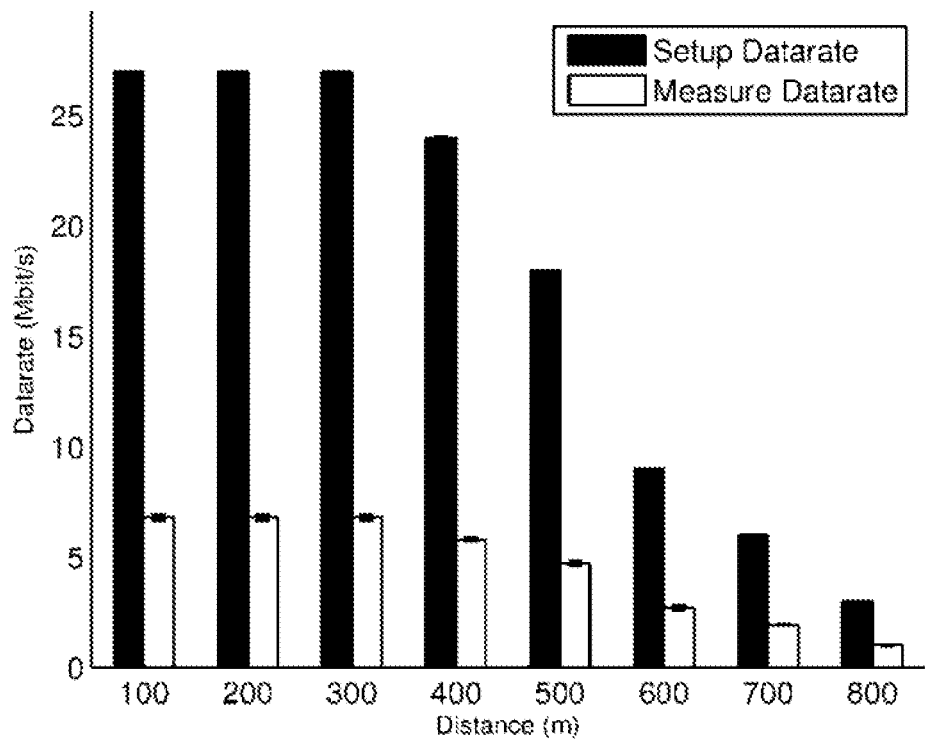
FIG. 11 shows the results comparing the maximum data rate set values and the values measured experimentally over the distance between two OBUs with Line-of-Sight.

As preliminary results, it is showed how the distance is influenced by the data rate. FIG. 11 compares the maximum data rate set values and the values measured experimentally over the distance between two OBUs with Line-of-Sight (LOS). The large discrepancy of the two values is explained by the IEEE 802.11p channel switching: the Service Channel (SCH) is only active in half of the transmission time. The communication is performed in a maximum distance of 800 meters with the date rate of 3 Mbits/s; there is also a drop in signal quality for distances larger than 500 meters. Setup data rate is the value that is configured in the high-level interface. Measure data rate is the power that is effectively delivered to the terminals of the antenna.

It is also presented the maximum range for data rates of 27 Mbits/s configured in the IEEE 802.11p interface, considering the OBUs side-by-side and spaced by 50 meters. All results consider a mean and confidence interval of ten repetitions.

Table 2 presents the Round-Trip Time (RTT) and the throughput obtained when the nodes are placed side-by-side.

The RTT the results show a good performance: there are three wireless hops, and the IEEE 802.11p is working in alternate mode. The confidence interval is small, which shows the small variation in the RTT values.

TABLE 2

Throughput and RTT with OBUs side-by-side
and IEEE 802.11p configured at 27 Mbits/s

| Metric | Value | Confidence Interval |
|---|---|---|
| RTT (ms) | 32.2712 | ±3.65539 |
| UDP Throughput (Mbits/s) | 6.828 | ±0.15672 |
| TCP Throughput (Mbits/s) | 3.532 | ±0.13241 |

The throughput results also show good performance, especially with the transport protocol UDP, even in the IEEE 802.11p alternate mode. With the transport protocol TCP the throughput is lower, due to its congestion control and retransmission mechanisms.

Figure 12:
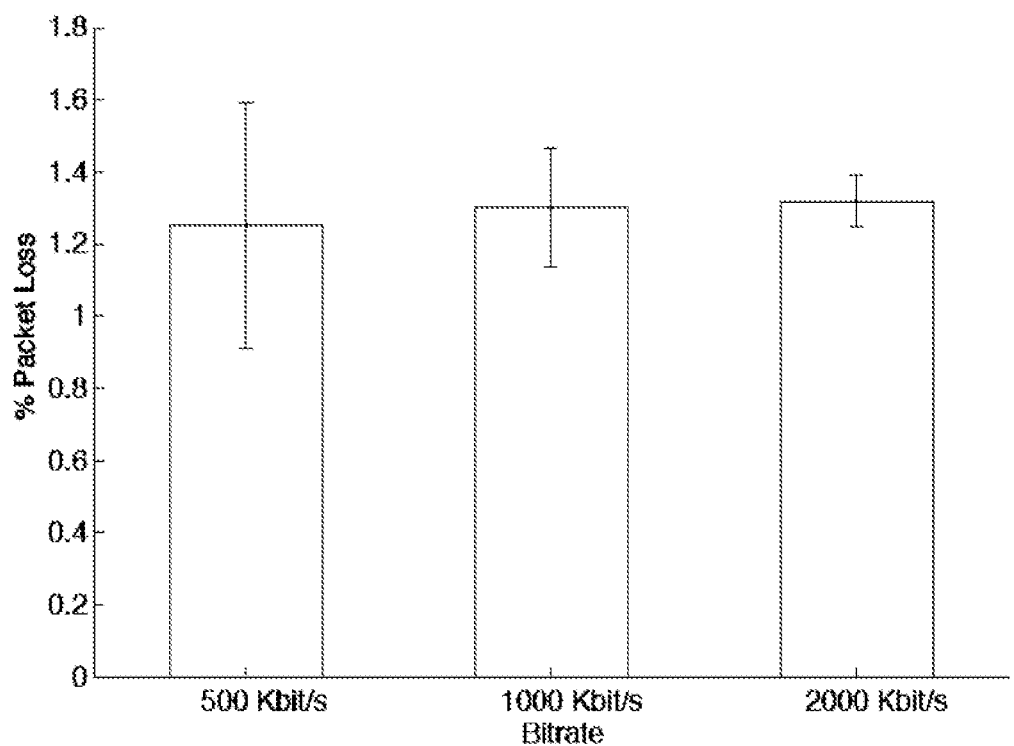
FIG. 12 presents results for the packet loss with three different bitrates, in the same conditions as before.

FIG. 12 presents the packet loss with three different bitrates, when the OBUs are placed side-by-side. The values are low, around 1.2% and 1.4% and similar for the different bitrates.

Table 3 depicts the same metrics with the OBUs spaced 50 meters. Comparing with side-by-side results, it is observed that the results are similar.

Figure 13:
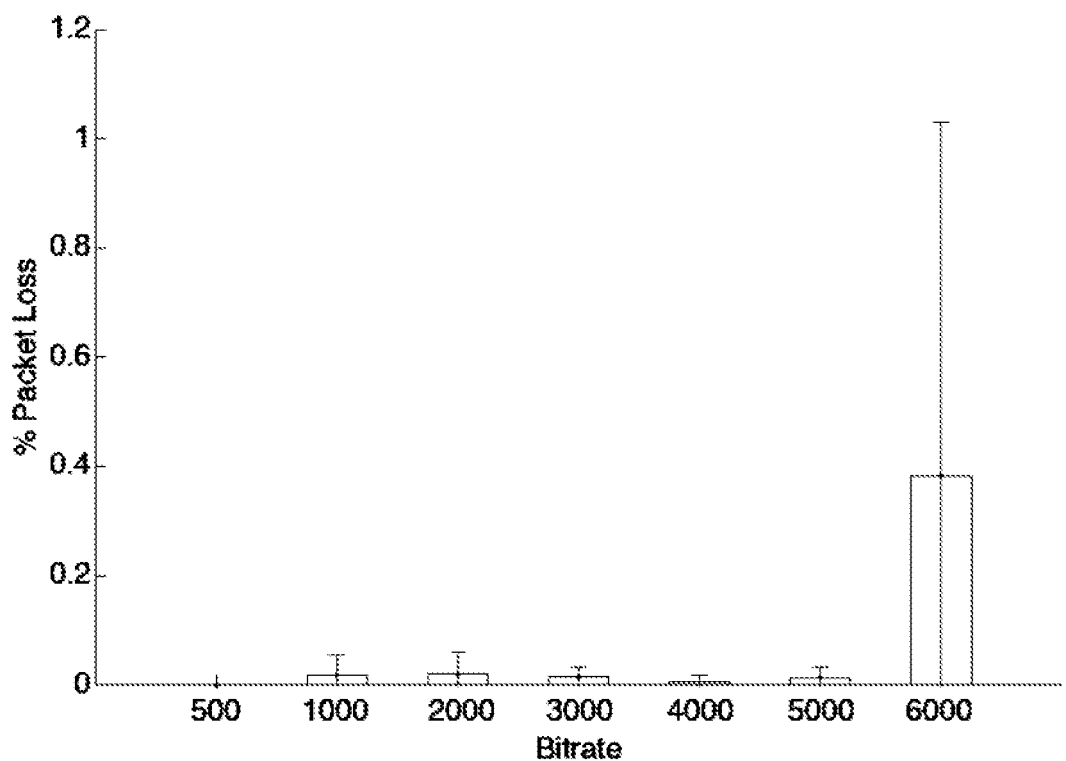
FIG. 13 shows results for the percentage of lost packets with different bitrates at 50 m distance.

FIG. 13 shows the percentage of lost packets with different bitrates at 50 m distance. As can be seen the percentage of lost packets is very small, even with the 6 Mbits/s bitrate (close to the throughput limit). Comparing with FIG. 12, it is possible to observe an improvement: the space between nodes decreases the networks' interference, since with the OBUS placed side-by-side, the percentages of losses are approximately 1.2% (see FIG. 12), but when they are spaced by 50 meters, these percentages decrease to less than 0.2% (see FIG. 13).

TABLE 3

Throughput and RTT with OBUs spaced 50 meters and
IEEE 802.11p configured at 27 Mbits/s

| Metric | Value | Confidence Interval |
|---|---|---|
| RTT (ms) | 31.671 | ±4.53991 |
| UDP Throughput (Mbits/s) | 6.894 | ±0.29870 |

There are also shown the results obtained with OBUs spaced by 600 meters. At this distance, in order to obtain communication, it has to be configured the IEEE 802.11p interfaces with a data rate of 3 Mbits/s in both OBUs (taking into account FIG. 11) since there is not LOS. Table 4 shows the results when a 1000 Kbits/s data stream traverses the network.

The results below show that the values remain similar when the OBUs spacing increases. It is also possible to verify that the difference in the IEEE 802.11p data rate does not affect the overall RTT. It is observed that, even with a significant distance between OBUs and significant communication traffic, it is possible to have reliable communications without decrease in the QoS. This conclusion can be supported by the fact that the packet loss does not significantly increase.

TABLE 4

Comparison between OBUs side-by-side and spaced 50 and 600 meters

| | IEEE 802.11p 27 Mbits/s | | IEEE 802.11p 3 Mbits/s | |
|---|---|---|---|---|
| Metric | Side-by-Side | Spaced 50 m | Side-by-Side | Spaced 600 m |
| RTT (ms) | 32.27 ± 3.66 | 31.67 ± 4.54 | 32.42 ± 5.17 | 35.17 ± 5.65 |
| UDP Throughput (Mbits/s) | 6.83 ± 0.16 | 6.89 ± 0.30 | 1.16 ± 0.04 | 1.03 ± 0.14 |
| Packet Loss (%) | 1.252 ± 0.34 | 0 | 0.09 ± 0.12 | 2.22 ± 1.95 |

It is also presented using extension cables to interconnect the board and the antennas, to understand if these cables may change the quality of communications.

The first difference noticed below, when extension cables are used, is the decrease of communication range. Without cables, as said before, it is possible to have good QoS at distances over 600 meters. However, with cables this distance reduces to approximately 300 meters.

Table 5 shows the impact of using extension cables in the same metrics obtained before. In these two cases, the IEEE 802.11p data rate is configured with a data rate of 3 Mbits/s.

TABLE 5

Comparison between communications with and without extension cables

| Metric | W/o extension cables - 600 m | With extension cables - 300 m |
|---|---|---|
| RTT (ms) | 35.17 ± 5.65 | 34.84 ± 6.24 |
| UDP Throughput (Mbits/s) | 1.03 ± 0.14 | 0.68 ± 0.072 |
| Packet Loss (%) | 2.22 ± 1.95 | 31.18 7.25 |

Comparing the values presented in the Table 5, it can be seen that the extension cables do not affect the RTT values, but the throughput and packet loss significantly degrades. Throughput reduces from 1 Mbits/s to 0.68, and packet loss increases to almost 30%. These results show that the use of extension cables have a strong impact in the communication.

Figure 14:
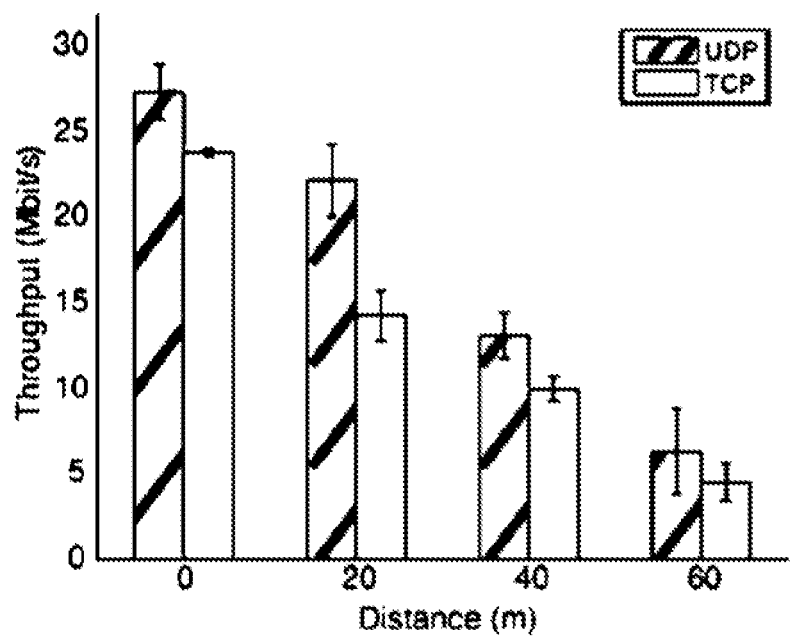
FIG. 14 shows throughput versus distance results.
Figure 15:
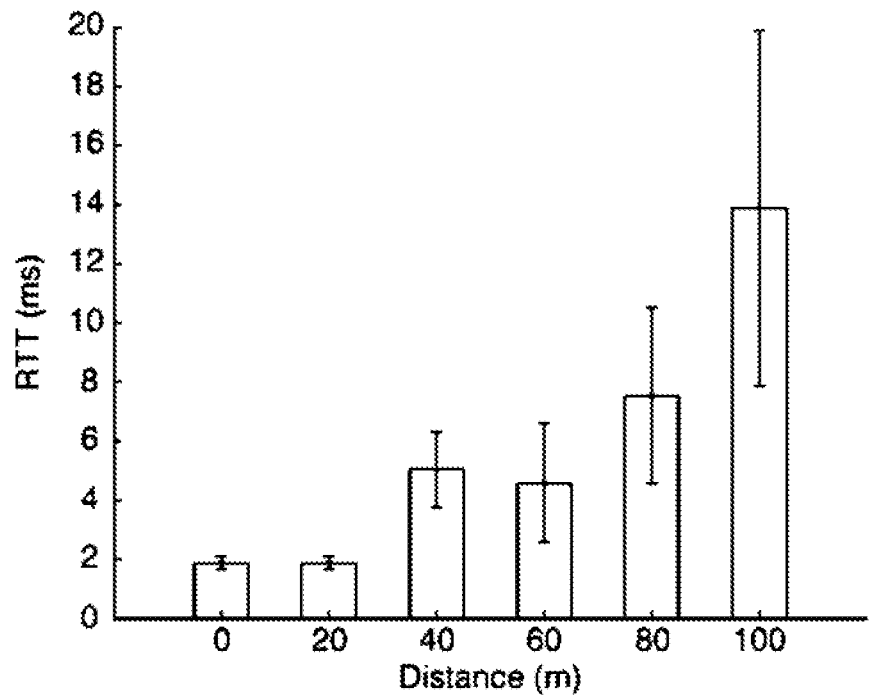
FIG. 15 shows Round Trip Time (RTT) versus distance results.

In order to compare the communication range of this solution with the communication range of a regular IEEE 802.11a/b/g/n hotspot, it is measured the throughput and the RTT achieved in a communication between a user and the hotspot versus the distance between them. The FIGS. 14 and 15 show the results for a IEEE 802.11a/b/g/n hotspot: the throughput is high when the nodes are placed side-by-side, it decreases quickly with the distance between nodes, and when it exceeds 60 meters the throughput is approximately null; the delay is very small for low distances, but it increases with the increase of the distance between nodes. For distances higher than 100 meters there is no communication between nodes. FIG. 14 shows throughput versus distance while FIG. 13 shows Round Trip Time versus distance.

It is also discussed the switching between networks and between technologies, which is provided by the connection manager integrated with a mobility protocol (in the current evaluation it is used a modified and enhanced version of Proxy Mobile IPv6-PMIPv6). In order to obtain better results, it was preferred to create new features on PMIPv6. These improvements allow handovers between the three different technologies used in the defined architecture, and provide a tunnel exchange method through the creation of a new tunnel before disconnecting the active one, making the switching between different networks more quickly and smoothly, decreasing the packet loss and the handover latency.

Figure 16:
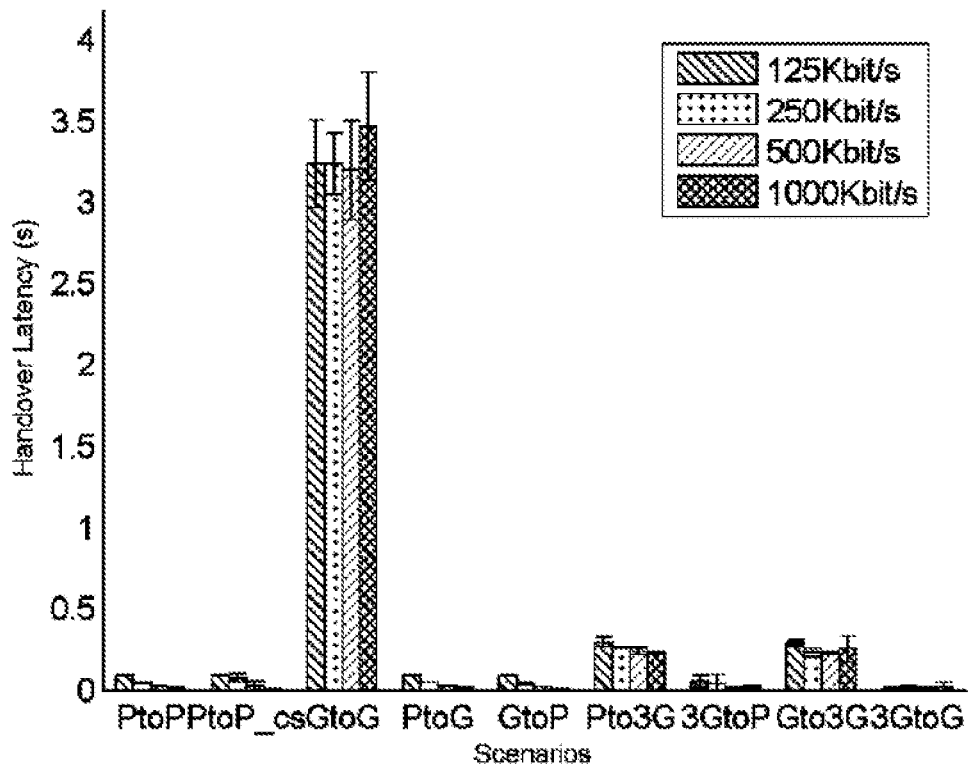
FIG. 16 describes the handover latency with a stationary vehicle.

FIG. 16 shows the time required for the switching between different networks or technologies. Table 6 shows the correspondence between the scenarios and the label included in the plot.

In all the heterogeneous switching scenarios, it is possible to observe that the handover is performed in a seamless manner, except in the Gto3G and Pto3G scenarios, when using a bitrate of 1000 Kbit/s. However, this behavior is not related with handover itself, but with the low bandwidth and high latency of the commercial 3G connection.

The discrepancy between GtoG and the other switching scenarios is due to the impossibility of performing a make-before-break handover in this scenario (i.e., make a new association before turning off the current link). In PtoP switching, the absence of association and authentication make this switching very fast. The same happens for PtoP_cs that considers channel switching.

TABLE 6

| Handover Technologies | | | | |
|---|---|---|---|---|
| Technology | IEEE 802.11p | IEEE 802.11p CS | IEEE 802.11a/b/g/n | 3G |
| IEEE 802.11p | PtoP | — | PtoG | Pto3G |
| IEEE 802.11p CS | — | PtoP_cs | — | — |
| IEEE 802.11a/b/g/n | GtoP | — | GtoG | Gto3G |
| 3G | 3GtoP | — | 3GtoG | — |

The connection manager provides considerable improvements when compared to traditional (prior-art) connection managers, which are presented through the following set of results.

BCM (Basic Connection Manager) and PCM (Preference-based Connection Manager) are two connection managers used to determine the advantage of using the present VANET connection manager (VCM). BCM is a traditional connection manager, which selects the best network to connect based solely on the signal quality. PCM is another traditional connection manager based on a preferred technology to use, choosing IEEE 802.11p with higher preference, followed by IEEE 802.11g and then cellular. VCM is the connection manager according to the present disclosure and embodiments, which uses an AHP-based strategy to select the most appropriate available network and technology.

The evaluation was performed for three node densities in a Manhattan grid scenario where 6 RSUs and 30 Wi-Fi access points were randomly placed. Vehicles circulate using a car-following model with a maximum speed of 50 Km/h.

Figure 17:
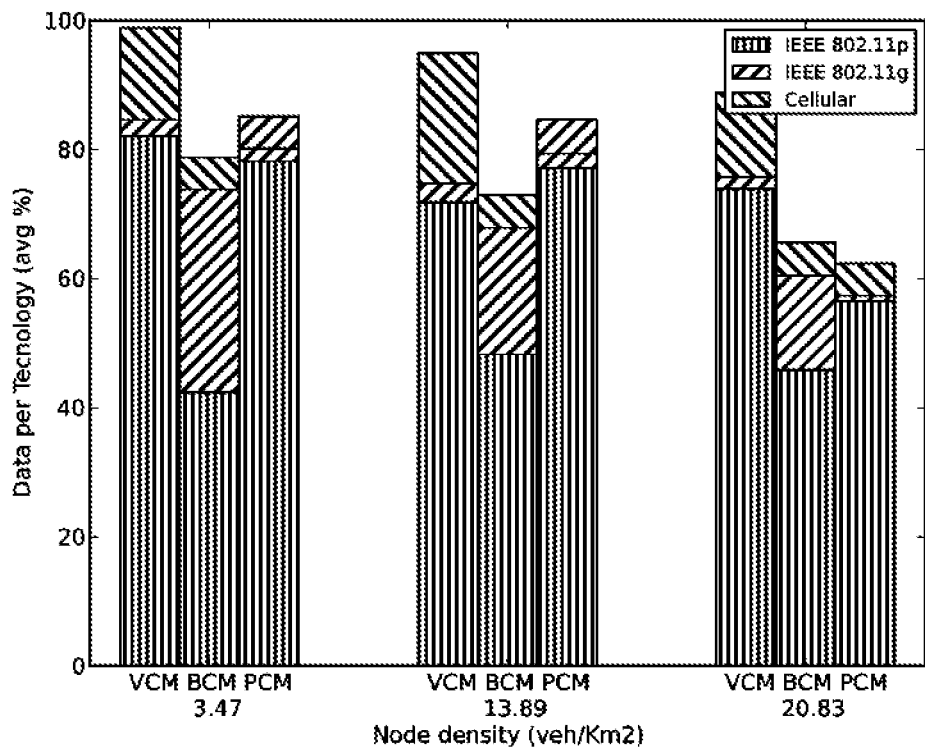
FIG. 17 describes the results on the data received per technology as a percentage of the data sent.

Concerning the results of FIG. 17, it can be seen that IEEE 802.11p is the technology preferred by all the connection managers, which is according to expected, since it provides the highest transmission range at the lowest cost, hence the best signal quality and expected contact time. VCM sends more data through the cellular network, since it realizes that there is not enough coverage to send all the data through IEEE 802.11p, and instead of trying to connect to Wi-Fi access points at high speeds like its counterparts do, connects to the cellular network to avoid the association times of Wi-Fi. That phenomenon is specially observed in BCM, which blindly connects to the infrastructure point with the highest signal quality.

Figure 18:
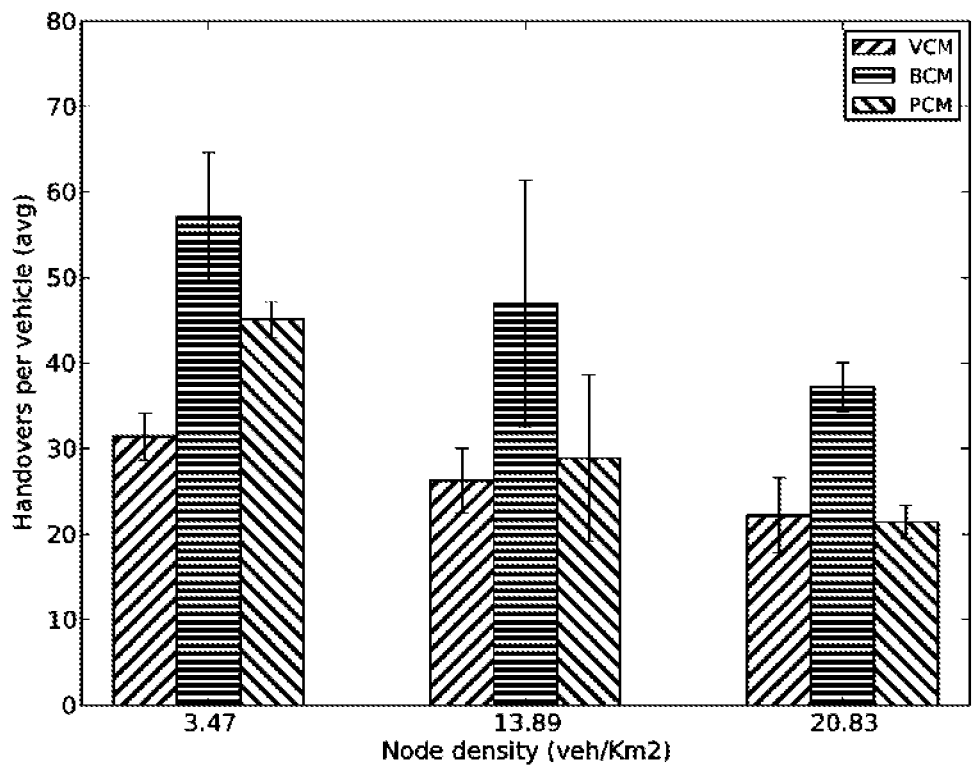
FIG. 18 describes the results for the handovers per vehicle.

Concerning the handover results of FIG. 18, VCM performs significantly less handovers than its counterparts in low density scenarios. However, when the density of nodes increases, and also when the infrastructure coverage juxtaposition is expanded, this advantage is reduced, and in very crowded scenarios, the amount of handovers is even higher than for PCM. The explanation for this is shown in the next plot, where it will be seen that due to this increased amount of handovers, VCM is capable of significantly reducing the data loss.

There is yet another important observation, which is that the amount of handovers is reduced with the density of vehicles. This is explained by the increasing quality of the mesh network with the density of vehicles. As the nodes communicate in a mesh, only the mesh gateways hop through the infrastructure, reducing the amount of handovers of the inner nodes.

Figure 19:
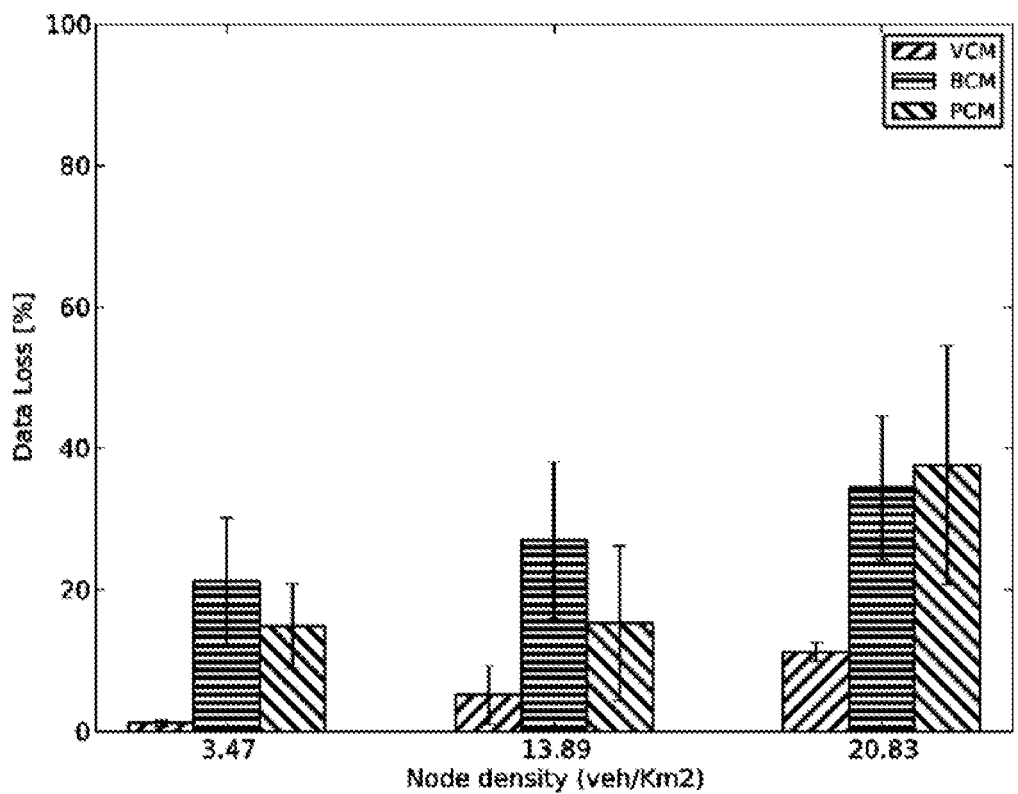
FIG. 19 describes the results for the data loss as a percentage of the data sent.

Concerning the results of FIG. 19, it can be seen that VCM maintains the data loss below 10% in these scenarios at all times, except when the density of vehicles and infrastructure nodes is very high. It can also be seen that in this case SCM and PCM have nearly 60% of data loss, against 18% of VCM.

VCM presents a considerably low data loss even in adverse scenarios, where its counterparts have significant losses, because it can distinguish infrastructure points with available resources from those which are overloaded. This balances the load in the network and reduces the interference between nodes.

Concerning the mesh network, since VCM compiles information about how far, in terms of hops, a mesh node is from the infrastructure, it can select the gateway which will provide it with a faster way to reach the desired network, and which, consequently, is less prone to disconnections.

Optionally, the scoring function parameters may be dynamically adjusted. The device may log connection statistics such that it may e.g. increment or decrement one or more of the scoring parameters in order to improve results.

A further embodiment includes using parked cars for redistributing Wi-Fi signal from fixed hotspots. DSRC connections are defined to be multi-hop and this provides advantages that can be used even if the vehicle is not being used (parked). Normally, parked cars may switch off the device here disclosed. Alternatively, up to a limit of battery drain, the parked car may still provide power to the device. In this situation, the connection manager is modified not to transmit data from any mobile network. In this situation, the car acts as relay of already available networks (either DSRC or Wi-Fi) through DSRC to other cars and/or through Wi-Fi to users. The parked status of the car may be simply determined by inspecting the GPS speed information, e.g. the car has not moved for a predetermined time, or by detecting if the manual brake is engaged, the car ignition is switched off, the car key has been removed from the ignition lock, or the door locks are engaged.

In an embodiment, the data connection may be used by the car own systems, such as the navigation system, sound system, emergency services system, among others that require connectivity.

In an embodiment, the connection manager may be configured to apply a minimum time before switching networks, a specific holding time. This may be useful in situations of high noise or high unpredictability, thus avoiding too frequent handovers.

Alternatively, a minimum threshold may be implemented, such that the configuration manager is configured to require a score that is higher than the current network score by a threshold before a network change is executed. Both methods can be combined, requiring both a holding time and scoring threshold before a network switch can happen.

As mentioned above, a connection manager s proposed based on an AHP scoring that combines several candidate networks, which takes into account the vehicle state, such as the speed and heading, and the features of the surrounding environment, such as the infrastructure position and availability, besides the quality of link to determine which of the visible networks is more indicated for each user. In order to obtain the optimal parameters (priorities) for the AHP, it is used a combination of pairwise comparisons between the criteria involved, according to Saaty's pairwise comparison scale, along with for example a Genetic Algorithm (GA) combined with a scenario simulator NS-3 for the process optimization, due to the large number of criteria. For instance, we can make use of a GA with 100 elements per generation with a maximum number of 300 generations (with these values, we can observe the rapid convergence of the GA). With the help of NS-3, we can setup very generic vehicular scenarios composed by a distinct number of vehicles with pre-defined trajectory, and can easily setup variations in terms of the speed of the vehicles and the density of the infrastructure. Moreover, we can divide the scenarios in more than one zone, in order to allow, in the one hand, for the sharpening of the capacity of dealing with a high amount of possible connections, and on the other hand, to create the obligation of dealing with scenarios where the most preferable technology is not available, providing the connection manager with more resilience to these cases.

In order to determine the priority values, it is proposed the combination of pairwise comparisons between the criteria involved, according to Saaty's pairwise comparison scale. Hence, it is proposed to use the comparison scale to rate each alternative according to its properties. AHP relies on the decomposition of the problem in a hierarchical manner, where the elements are sorted according to their importance for the decision, creating a stratified nature of the decision. Decision making involves many criteria and subcriteria used to rank the alternatives of a decision through pairwise comparisons and relies on the judgments of experts to derive priority scales which measure intangible in relative terms. To make AHP comparisons, a scale of numbers that indicate how many times more important one element is over another element is needed, usually 1 to 9 or 1/9 to 1.

It is to be noted that stopped/very slow vehicles usually have the lowest restrictions in terms of the number of available and convenient access technologies. They will be able to connect to available wifi hotspots at their range, but normally the main preference still be IEEE 802.11p since the time when they will start moving is unpredictable and may loose connectivity on the wifi link. The cellular technology will usually be the last choice which means that it will be only used as a last resource due to its high latency and the cost associated.

Normally, moving slowly vehicles can also connect to available wifi hotspots, but now with some restrictions due to the short range of the technology. The slow speed of the vehicle opens doors to prediction of the future position in the mechanism of network selection which must provide fast handovers between wifi hotspots. The highest preference for communications of these vehicles will normally be the IEEE 802.11p due to the higher range of the technology. The cellular network will be used whenever there are no other solutions available, or when it is required to provide a good QoS to fulfill the user requirements above all the alternatives and that fact compensates the associated price.

Normally, moving fast vehicles can only rely on IEEE 802.11p besides cellular technology, for communications due to the high speed presented. These vehicles must quickly understand the environment and select the best network to connect at each moment. The cellular network is normally also used when it is required to provide a good QoS to fill the user requirements above all the alternatives and that fact compensates the associated price.

Thus, the AHP should have different parameters according to the velocity of the vehicle, as previously discussed.

In the dynamic environment of the medium in which the connection manager will operate, it is expected a strong variation in some parameters such as RSS value and the expected contact time. Thus, an extra factor may be included, an hysteresis—H—in the network selection. This factor must ensure that just a small variation in the overall priority of a specific technology in relation to another one will not be enough to supersede the previous network selection.

The hysteresis value is highly dependent of the motion of the vehicle, therefore it will be generated by the GA just like the level 2 and 3 of priorities. For instance, Table 7 presents the values of the hysteresis provided by a GA. It is possible to conclude that, for higher speeds, the hysteresis value increases, which is explained by the fact that vehicles moving at lower speeds have a better perception of the changes in the environment than those who move with higher speeds.

TABLE 7

Hysteresis Values

| Categories | Hysteresis |
| --- | --- |
| Moving Fast | 0.104 |
| Moving Slowly | 0.103 |
| Stopped/Very Slow | 0.055 |

As mentioned, the priorities are typically determined by combining pairwise comparisons between all the criteria involved according to Saaty's pairwise comparison scale. However, due to the complexity of the environment and the amount of information, in order to perform an evaluation of the alternatives, it is used the GA combining with simulation. Through simulation, it has been possible to combine and experience multiple cases, importing the obtained quality metrics for each of the cases to GA.

The Saaty's pairwise comparison scale has been used to rate each alternative according to its properties (level 4). Therefore, there are predefined a set of priorities based on a quantitative scale, which represents the final rating tables for each criterion used (examples are provided below).

$p_i$ represents the priority of a certain criterion and the $Np_i$ represents the normalized priority according to:

$$N(p_i) = \frac{p_i}{\sum_i p_i}$$

Regarding the price criterion, it is considered the same values for both the operator and the user. However, these values can be changed, depending on the actual reality.

In table 8 it is shown an example of the price ratings, where it has been considered that a free connection is considered to be extremely preferable to an expensive one (9), and moderately preferable when compared to an affordable connection (7).

TABLE 8

Price ratings for the user and operator

| Price | Free | Affordable | Expensive | $p_i$ | $N(p_i)$ |
|---|---|---|---|---|---|
| Free | 1 | 7 | 9 | 0.760 | 1 |
| Affordable | 1/7 | 1 | 7 | 0.192 | 0.252 |
| Expensive | 1/9 | 1/7 | 1 | 0.048 | 0.063 |

The RSS is, perhaps, the hardest parameter to grade due to its variation. Another fact that must be taken into account is the difference of RSS values presented by each technology. Therefore, it is presented different ratings for each technology, according to the following tables for IEEE 802.11p technology, for IEEE 802.11p mesh technology, and for IEEE 802.11a/b/g/n technology.

In order to rate the RSS, it is considered the maximum value for each technology, giving t the maximum rating (equals 1). Then, it is considered decays of 3 dBm in the signal quality cause a decreasing of the rating values.

TABLE 9

IEEE 802.11p RSS ratings

| RSS | −66 | −69 | −72 | −75 | −78 | −81 | −84 | $p_i$ | $N(p_i)$ |
|---|---|---|---|---|---|---|---|---|---|
| −66 | 1 | 4 | 5 | 6 | 7 | 8 | 9 | 0.419 | 1 |
| −69 | 1/4 | 1 | 4 | 5 | 6 | 7 | 8 | 0.248 | 0.593 |
| −72 | 1/5 | 1/4 | 1 | 4 | 5 | 6 | 7 | 0.147 | 0.351 |
| −75 | 1/6 | 1/5 | 1/4 | 1 | 4 | 5 | 6 | 0.087 | 0.207 |
| −78 | 1/7 | 1/6 | 1/5 | 1/4 | 1 | 4 | 5 | 0.051 | 0.122 |
| −81 | 1/8 | 1/7 | 1/6 | 1/5 | 1/4 | 1 | 4 | 0.030 | 0.722 |
| −84 | 1/9 | 1/8 | 1/7 | 1/6 | 1/5 | 1/4 | 1 | 0.018 | 0.044 |

TABLE 10

IEEE 802.11p mesh RSS ratings

| RSS | −39 | −42 | −45 | −48 | −51 | −54 | −57 | $p_i$ | $N(p_i)$ |
|---|---|---|---|---|---|---|---|---|---|
| −39 | 1 | 4 | 5 | 6 | 7 | 8 | 9 | 0.419 | 1 |
| −42 | 1/4 | 1 | 4 | 5 | 6 | 7 | 8 | 0.248 | 0.593 |
| −45 | 1/5 | 1/4 | 1 | 4 | 5 | 6 | 7 | 0.147 | 0.351 |
| −48 | 1/6 | 1/5 | 1/4 | 1 | 4 | 5 | 6 | 0.087 | 0.207 |
| −51 | 1/7 | 1/6 | 1/5 | 1/4 | 1 | 4 | 5 | 0.051 | 0.122 |
| −54 | 1/8 | 1/7 | 1/6 | 1/5 | 1/4 | 1 | 4 | 0.030 | 0.722 |
| −57 | 1/9 | 1/8 | 1/7 | 1/6 | 1/5 | 1/4 | 1 | 0.018 | 0.044 |

TABLE 11

IEEE 802.11g RSS ratings

| RSS | −38 | −41 | −44 | −47 | −50 | −53 | −56 | $p_i$ | $N(p_i)$ |
|---|---|---|---|---|---|---|---|---|---|
| −38 | 1 | 4 | 5 | 6 | 7 | 8 | 9 | 0.419 | 1 |
| −41 | 1/4 | 1 | 4 | 5 | 6 | 7 | 8 | 0.248 | 0.593 |
| −44 | 1/5 | 1/4 | 1 | 4 | 5 | 6 | 7 | 0.147 | 0.351 |
| −47 | 1/6 | 1/5 | 1/4 | 1 | 4 | 5 | 6 | 0.087 | 0.207 |
| −50 | 1/7 | 1/6 | 1/5 | 1/4 | 1 | 4 | 5 | 0.051 | 0.122 |
| −53 | 1/8 | 1/7 | 1/6 | 1/5 | 1/4 | 1 | 4 | 0.030 | 0.722 |
| −56 | 1/9 | 1/8 | 1/7 | 1/6 | 1/5 | 1/4 | 1 | 0.018 | 0.044 |

With this density (or availability) criterion, it is proposed to quantify the available resources that a certain node has to accommodate one more connection. This criterion is directly related to the upstream/downstream bandwidth, where the simplest way to perform it is to quantify the rate between the number of connected users and the maximum number of users which that node accepts. Table 12 displays the ratings for this criterion. It is considered that an infrastructure with at least 75% of availability has top rating (1), and it is moderately preferable than an infrastructure at most 50% (2) and extremely preferable (7,9) to infrastructures with at most 25% or 10% of availability. The availability is defined by one minus the ratio between the number of connected users and the maximum number of users that a particular node accepts, where the latter value can be a particular value for each technology.

TABLE 12

Availability ratings

| Availability | 75% | 50% | 25% | 10% | $p_i$ | $N(p_i)$ |
|---|---|---|---|---|---|---|
| 75% | 1 | 2 | 5 | 6 | 0.500 | 1 |
| 50% | 1/2 | 1 | 2 | 5 | 0.302 | 0.603 |
| 25% | 1/5 | 1/3 | 1 | 6 | 0.150 | 0.300 |
| 10% | 1/6 | 1/6 | 1/6 | 1 | 0.048 | 0.097 |

The expected contact time represents in time units, for how long a node will be able to communicate with a candidate connection which the calculation is explained above. This criterion is quite important for the network selection mechanism which Intends to reduce the number of intra and inter-technology handovers, providing more stable connections and reducing the amount of processes involved. The rating of this criterion is shown in table 13. It is considered than a connection with an expected contact time with at least 25 s has top rating (1), and it is moderately preferable (2) when compared to infrastructures that at least 20 s of expected contact time, and extremely preferable (5,6) when compared to infrastructures that have at least 15 s of expect contact time.

TABLE 13

Expected contact time ratings

| Exp. Contact Time | 25 s | 20 s | 15 s | 10 s | 5 s | $p_i$ | $N(p_i)$ |
|---|---|---|---|---|---|---|---|
| 25 s | 1 | 2 | 5 | 6 | 6 | 0.500 | 1 |
| 20 s | 1/2 | 1 | 2 | 5 | 5 | 0.302 | 0.603 |
| 15 s | 1/5 | 1/3 | 1 | 6 | 6 | 0.150 | 0.300 |

TABLE 13-continued

Expected contact time ratings

| Exp. Contact Time | 25 s | 20 s | 15 s | 10 s | 5 s | $p_i$ | $N(p_i)$ |
|---|---|---|---|---|---|---|---|
| 10 s | 1/6 | 1/6 | 1/6 | 1 | 1 | 0.048 | 0.097 |
| 5 s | 1/6 | 1/6 | 1/6 | 1 | 1 | 0.048 | 0.097 |

The number of hops criterion s expected to quantify the number of hops in a path from the source of Information to the infrastructure unit. The more number of hops in the communication path, the more it is aimed to penalize, which is directly related to the quality of the link. The ratings for this criterion are shown in table 14. It is considered that a connection with at most one hop between the vehicle and the service provider has the top rating (1), and it is moderately preferable when compared to a candidate with at least two hops (3), and extremely preferable (6) when compared to a candidate with at least 3 hops to reach the service provider.

TABLE 14

Number of hops ratings

| Nr. of Hops | 1 | 2 | 3 | $p_i$ | $N(p_i)$ |
|---|---|---|---|---|---|
| 1 | 1 | 3 | 6 | 0.655 | 1 |
| 2 | 1/3 | 1 | 3 | 0.250 | 0.382 |
| 3 | 1/6 | 1/3 | 1 | 0.095 | 0.146 |

Now that it is obtained the level 4 of priorities according to the Saaty's comparison scale, it is needed to explain the conceptual part for the calculation of the remaining levels of priorities through the GA.

The GA proposes several priority combinations between the parameters while refining its choice as it evolves towards convergence. Therefore, the priorities calculated by the GA are in level 2 of the AHP: Price, RSS and Backdrop; and in level 3: PriceUsr, PriceOperator, Hops, ConnectedNodes and ExpContactTime. The hysteresis value is also determined by the GA.

The GA generates possible solutions composed by multiple combinations of priorities and hysteresis values, and sends it to the NS-3 simulator, which returns the evaluation metrics (Dtx, Orx, D_3G_rx and Nh) that will be used in the fitness function defined by the equation:

$$F = 1 - \frac{D_{tx} - D_{rx}}{D_{tx}} \cdot \alpha - \frac{D_{rx}^{3G}}{D_{tx}} \cdot \beta - N_h \cdot \gamma$$

Drx represents the total data received, the Dtx the total data transmitted, D_3G_rx represents the data received by cellular networks, and Nh represents the number of handovers performed. As can be observed in the fitness function, it is aimed to penalize the possible solutions according to the data transmitted over cellular network, the number of handovers and the percentage of data loss.

The coefficients alpha, beta and gamma are weights used for each of the equation parcels, where the weights in table 15 represent the used weights of the fitness function according to the vehicle motion, in order to obtain the priority values for each category of speed.

TABLE 15

Weights of the fitness function according to vehicle motion

| | α | β | γ |
|---|---|---|---|
| Stopped/Very Slow | 1.0 | 1.0 | 0.01 |
| Moving Slowly | 1.0 | 0.6 | 0.01 |
| Moving Fast | 1.0 | 0.1 | 0.01 |

The coefficient alpha represents the percentage of data loss, which in the case of being 100% brings the fitness value to 0.

Coefficient beta was the only one that changed through the scenarios, which is easily explained by the fact that the faster the vehicle is moving, the less it is expected to penalize the utilization of cellular technologies.

The "forced" penalization for the Wi-Fi technology is not included in the fitness function, due to the natural penalty that occurs in the association process leading to an increase in data loss, decreasing the overall fitness of the possible solution. The penalty will be directly observed in the packet loss. In the case of IEEE 802.11p, since it is a free technology, with no restrictions in terms of association process, it is not wanted to penalize it in the fitness function.

These priority values are then calculated in specific scenarios through the maximization of the fitness function above.

It will be appreciated by those of ordinary skill in the art that unless otherwise indicated herein, the particular sequence of steps described is Illustrative only and can be varied without departing from the disclosure. Thus, unless otherwise stated the steps described are so unordered meaning that, when possible, the steps can be performed in any convenient or desirable order.

It is to be appreciated that certain embodiments of the invention as described herein may be incorporated as code (e.g., a software algorithm or program) residing in firmware and/or on computer readable medium for execution on a computer system with a computer processor. Such a computer system typically includes memory storage configured to store output from execution of the code by which a processor is configured for executing the methods disclosed. The code can be arranged as firmware or software, and can be organized as a set of modules, including the various modules and algorithms described herein, such as discrete code modules, function calls, procedure calls or objects in an object-oriented programming environment. If implemented using modules, the code can comprise a single module or a plurality of modules that operate in cooperation with one another for configuring the computer system in which it is executed to perform the associated functions, as described herein.

The disclosure is of course not in any way restricted to the embodiments described herein and a person of ordinary skill in the area can provide many possibilities to modifications thereof as defined in the claims. The preferred embodiments described above are combinable. The following claims define further preferred embodiments of the disclosure.

REFERENCES

| | |
|---|---|
| US20120039248 | Method and system for in-vehicle wireless connectivity |
| US20100136909 | On-vehicle device and communication method |
| US20100261428 | Road-vehicle communication system |
| US20120225681 | Method of providing a vehicle with communication service and micro base station applied to vehicle |
| US20050083866 | Road-vehicle communication system, and roadside apparatus, mobile apparatus which are used for the same |
| US20100234071 | Vehicle integrated communications system |
| US20100198455 | Information distributing system and vehicle-mounted device |
| US20070083318 | Adaptive cruise control using vehicle-to-vehicle wireless communication |
| U.S. Pat. No. 8,299,940 | Road-vehicle communication system and vehicle-mounted device |
| U.S. Pat. No. 8,280,583 | Transmission of vehicle-relevant data of a vehicle via mobile communication |
| U.S. Pat. No. 8,274,405 | System and method for device management on a dedicated short-range communication network |
| U.S. Pat. No. 7,970,540 | A system and method of vehicular wireless communication over a dedicated short range communication service band |
| U.S. Pat. No. 7,003,261 | Expanding the scope of coverage of wireless cellular telephone systems into regions beyond the cellular array areas by proliferating the installation of transmission repeaters into automobiles that may be randomly driven within these regions |
| US20120106544 | Vehicle network link module |
| EP2146486 | System and method for improving communications between vehicles |
| SAVARI_PRODS | Mobiwave (obu)/streetwave (rsu) |
| U.S. Pat. No. 7,062,239 | On-vehicle equipment for dedicated short-range communication in intelligent transport system |
| U.S. Pat. No. 7,176,810 | On-vehicle dsrc apparatus |
| U.S. Pat. No. 7,221,968 | Dedicated short-range communication apparatus for motor vehicle |
| U.S. Pat. No. 7,430,218 | Apparatus and method for providing users with road traffic information using ad-hoc network |
| U.S. Pat. No. 7,433,773 | Vehicle on-board unit |
| U.S. Pat. No. 7,554,435 | Vehicle on-board unit |
| U.S. Pat. No. 7,609,174 | Vehicle information communication system |
| U.S. Pat. No. 7,804,423 | Real time traffic aide |
| U.S. Pat. No. 7,983,206 | Integrated system and method for interactive communication and multimedia support in vehicles |
| U.S. Pat. No. 6,721,632 | Wireless exchange between vehicle-borne communications systems |
| U.S. Pat. No. 7,734,803 | System and method for subscription-based content distribution to vehicles via wireless communication |
| U.S. Pat. No. 8,180,297 | Establishment of communications connections between vehicles |
| U.S. Pat. No. 8,279,082 | Intelligent transport (it) system using wireless communication between a roadside device and an in-vehicle device |
| U.S. Pat. No. 8,300,564 | Opportunistic data transfer between vehicles |
| U.S. Pat. No. 8,358,221 | Vehicle-mounted device, output propriety judgment method, communication system and program |
| WO2012012836 | An intelligent transportation systems device |
| US20080136670 | Vehicle information communication system |
| US20090170434 | Method of vehicle to vehicle communication |
| US20070030857 | Mobile router device |
| US20130002414 | Vehicle meter cluster |
| US20100019891 | Inter-vehicle communication feature awareness and diagnosis system |
| US20100318261 | Vehicle-mounted device, roadside apparatus, control method and program |
| US20110095908 | Mobile sensing for road safety, traffic management, and road maintenance |
| US20110010443 | Information provision system, terminal for transmitting/receiving information, and information provision method |
| US20110029232 | Distribution system and vehicle-mounted device |
| US20110034201 | On-board communication device and cooperative road-to-vehicle/vehicle-to-vehicle communication system |
| US20110196969 | In-vehicle communication device with social networking |
| US20110298636 | Vehicle-mounted device and information distribution system |
| US20120108163 | Intelligent telematics information dissemination using delegation, fetch, and share algorithms |
| US20120275445 | Vehicle communication system |
| US20120158820 | Information gathering system using multi-radio telematics devices |

| | |
|---|---|
| US20120317161 | Systems and methods for determining recommended media content for exchange between vehicles |
| US20120163275 | Method of providing wireless communication between vehicle and roadside and vehicle wireless communication device using the same |
| US20120239294 | Vehicle antenna unit |
| U.S. Pat. No. 6,785,511 | Wireless vehicular repeater system |
| U.S. Pat. No. 7,003,261 | Expanding the scope of coverage of wireless cellular telephone systems into regions beyond the cellular array areas by proliferating the installation of transmission repeaters into automobiles that may be randomly driven within these regions |
| U.S. Pat. No. 7,764,978 | System and methods for providing in-building wireless network coverage |
| US20120039248 | Method and system for in-vehicle wireless connectivity |
| US20100311335 | Devices for ptp wireless high-output data transmission between a parked vehicle and a fixed infrastructure |
| US20100136909 | On-vehicle device and communication method |
| US20100248619 | Mobile relay communication system |
| U.S. Pat. No. 8,018,888 | Mobile wlan repeater system |
| U.S. Pat. No. 8,159,991 | Mobile wlan repeater system |
| US20130022031 | Relayed content distribution and data collection using vehicles |

The invention claimed is:

1. A mobile wireless network data router configured to connect vehicles to an Internet infrastructure through a multi-technology network device;
wherein the router is configured to form a mesh network of vehicles connected to the infrastructure,
wherein the router is configured to redistribute a Wi-Fi signal from a fixed hotspot among a plurality of parked vehicles, and
wherein a expected contact time between the network data router of a vehicle i and a reachable network j of another vehicle or Wi-Fi hotspot or roadside unit ("RSU"), is derived from a formula comprising:

$$\frac{-(a \cdot c + b \cdot d) \pm \sqrt{(c^2 + d^2) \cdot R^2 + (b \cdot c - a \cdot d)^2}}{c^2 + d^2}$$

wherein, $a = x_j(0) - x_i(0)$ $b = y_j(0) - y_i(0)$ $c = v_j \cos(\theta_j) - v_i \cos(\theta i)$ $d = v_j \sin(\theta_j) - v_i \sin(\theta i)$ and further wherein x and y are, respectively, the positions of the vehicles or Wi-Fi hotspots or RSUs in a Cartesian coordinate system, v represents a speed of vehicles and is equal to 0 for Wi-Fi hotspots or RSUs, wherein 8 is the angle formed with the road in which the vehicle is traveling, and R is the radio communication range of Wireless Access in Vehicular Environments ("WAVE") or Wi-Fi connections.

2. The wireless network data router of claim 1,
wherein the router is further configured to connect vehicles between themselves to perform Wireless Access in Vehicular Environments ("WAVE") through Dedicated Short Range Communications ("DSRC") and connect to the infrastructure through cellular or other wireless connections, and
wherein the router is further configured with a connection manager that selects active technologies by seamlessly switching between technologies according to the position and quality of reachable networks.

3. The wireless network data router of claim 2, further comprising:
a multi-connection interface for the WAVE;
a wireless local area network interface;
a mobile network data interface;
a downlink data connection interface for the vehicle and/or users in the vehicle and the vehicle's vicinity; and
a data processing unit configured to rout data between the interfaces;
wherein the data processing unit is further configured to:
calculate a score for each reachable network on the WAVE, wireless local area network and mobile network interfaces;
switch an uplink connection of the wireless network data router to the reachable network with a respective score within a threshold of scores (the "best score").

4. The wireless network data router of claim 3, wherein the score is weighted as a function of parameters including: signal strength, number of hops to reach a wired infrastructure, node density, and expected contact time.

5. The wireless network data router of claim 4, wherein the weighted scoring is based on an analytic hierarchy process ("AHP"), wherein the parameters of number of hops to reach a wired infrastructure, of node density, and of expected contact time are grouped in a backdrop parameter group representing an AHP criteria group.

6. The wireless network data router of claim 4, wherein the node density parameter is calculated by dividing the number of connected nodes by the number of maximum nodes in a reachable network.

7. The wireless network data router of claim 4, wherein the scoring weights are differentiated according to the current vehicle speed.

8. The wireless network data router of claim 7, wherein the scoring weights are differentiated according to one of three classes of current vehicle speed: stopped or moving below a first predetermined speed; moving above a first predetermined speed and below a second predetermined speed; or moving above a second predetermined speed; where the first predetermined speed is below the second predetermined speed.

9. The wireless network data router of claim 7, wherein the weighting scores are differentiated according to at least one of two classes of current vehicle speed: stopped or moving under a first predetermined speed; or moving over a first predetermined speed.

10. The wireless network data router of claim 4, wherein the score is a fuzzy logic weighted scoring.

11. The wireless network data router of claim 4, wherein the weighted scoring further includes a weight specific to each of the interfaces.

12. The wireless network data router of claim 4 wherein when the car is parked, the data processing unit is further configured to adjust the mobile network data interface weight to a value that prevents the data processing unit from selecting the mobile network data interface.

13. The wireless network data router of claim 4, wherein the data processing unit is further configured to refrain from switching the uplink connection of the wireless network data router to the reachable network with the best score until the sore of the reachable network with the best score is higher than the current network score by a predetermined hysteresis threshold.

14. The wireless network data router of claim 1, wherein when the car is parked, the data processing unit is further configured to not use the mobile network data interface.

15. The wireless network data router of claim 1, wherein the multi-connection interface for wireless access in the WAVE is a DSRC interface comprising IEEE 802.11p.

16. The wireless network data router of claim 1, wherein the Wi-Fi interface is an IEEE 802.11a/b/g and/or 802.11n interface.

17. The wireless network data router of claim 1, wherein the mobile network data interface is a 3G, 4G, LTE, Advanced LTE and/or WiMax interface.

18. The wireless network data router of claim 1, further comprising a downlink data connection interface for the vehicle and/or users in the vehicle and the vehicle's vicinity is a wireless local area network including Wi-Fi or Bluetooth.

19. A mobile wireless network data router configured to connect vehicles to an Internet infrastructure through a multi-technology network device;
   wherein the router is configured to form a mesh network of vehicles connected to the infrastructure,
   wherein the router is configured to redistribute a Wi-Fi signal from a fixed hotspot among a plurality of parked vehicles,
   wherein the router is configured to calculate a score for each reachable network on Wireless Access in Vehicular Environments ("WAVE"), wireless local area network and mobile network interfaces;
   wherein the score is weighted by optimizing, for a number of simulation scenarios, a fitness function that comprises:

$$F = 1 - \frac{D_{tx} - D_{rx}}{D_{tx}} \cdot \alpha - \frac{D_{rx}^{3G}}{D_{tx}} \cdot \beta - N_h \cdot \gamma$$

where $D_{rx}$ represents total data received, $D_{tx}$ represents total data transmitted, $D^{3G}_{rx}$ represents data received by at least one cellular network, and $N_h$ represents a number of handovers performed, and
where alpha α, beta β and gamma γ are coefficient weights of the fitness function F and where the coefficient weights are variable according to vehicle motion.

* * * * *